(12) United States Patent
Koshimizu et al.

(10) Patent No.: US 8,807,668 B2
(45) Date of Patent: Aug. 19, 2014

(54) VEHICLE BRAKING SYSTEM AND MASTER CYLINDER

(75) Inventors: Naganori Koshimizu, Kai (JP); Takato Ogiwara, Minami-Alps (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 845 days.

(21) Appl. No.: 12/730,704

(22) Filed: Mar. 24, 2010

(65) Prior Publication Data

US 2010/0244549 A1   Sep. 30, 2010

(30) Foreign Application Priority Data

Mar. 31, 2009  (JP) ................................ 2009/086714

(51) Int. Cl.
*B60T 8/88* (2006.01)
*B60T 11/18* (2006.01)
*B60T 7/04* (2006.01)
*B60T 8/42* (2006.01)

(52) U.S. Cl.
CPC .............. *B60T 11/18* (2013.01); *B60T 7/042* (2013.01); *Y10S 303/02* (2013.01)
USPC ................... 303/122; 303/114.1; 303/115.4; 303/DIG. 2; 303/191

(58) Field of Classification Search
USPC ............... 303/3, 11, 15, 122, 122.03, 122.09, 303/122.13, 191, 113.3, 114.1, 115.4, 303/DIG. 1, DIG. 2; 91/367, 376 R
See application file for complete search history.

(56) References Cited

U.S. PATENT DOCUMENTS

| | | | | |
|---|---|---|---|---|
| 4,668,021 A | * | 5/1987 | Cook | 303/117.1 |
| 4,736,992 A | * | 4/1988 | Hendrickson | 303/122.1 |
| 4,824,182 A | * | 4/1989 | Steffes et al. | 303/122.08 |
| 5,496,099 A | * | 3/1996 | Resch | 303/114.1 |
| 6,132,014 A | * | 10/2000 | Kiso et al. | 303/146 |
| 6,155,156 A | * | 12/2000 | Takasaki et al. | 91/367 |
| 6,698,202 B2 | | 3/2004 | Ogiwara et al. | |
| 2009/0045672 A1 | * | 2/2009 | Nishino et al. | 303/113.3 |
| 2010/0244549 A1 | * | 9/2010 | Koshimizu et al. | 303/14 |

FOREIGN PATENT DOCUMENTS

JP    2002-321609    11/2002

* cited by examiner

*Primary Examiner* — Melody Burch
(74) *Attorney, Agent, or Firm* — Wenderoth, Lind & Ponack, LLP

(57) ABSTRACT

Provided are a vehicle braking system and a master cylinder which are capable of providing a good pedal feel. A valve-opening pressure for a pressure-reducing valve of the master cylinder is set higher than a hydraulic pressure which is obtained with a pressing force on a brake pedal being 500 N and lower than a hydraulic pressure obtained at a time when a booster reaches a full-load point in case of failure of the booster so as to be specialized for improving pedal feel. Required performance in case of failure of the booster is realized by a pressure-intensifying unit.

15 Claims, 9 Drawing Sheets

VEHICLE BRAKING SYSTEM AND MASTER CYLINDER

BACKGROUND OF THE INVENTION

The present invention relates to a vehicle braking system and a master cylinder.

As a technology for shortening a stroke of a brake pedal so as to obtain a good pedal feel, a master cylinder including a large-diameter pressurized chamber and a small-diameter pressure chamber is known, for example. The master cylinder performs so-called fast fill for supplying a large volume of brake fluid from the large-diameter pressurized chamber to the small-diameter pressure chamber during an initial stage of the stroke so as to compensate for an ineffective fluid amount during the initial stage of the stroke. Thereafter, a pressure-reducing valve is opened at a predetermined hydraulic pressure to reduce a hydraulic pressure in the large-diameter pressurized chamber. As a result, a desired braking force is obtained while the stroke of the brake pedal during the initial stage of the stroke is shortened. An example of the master cylinder as described above is described in Japanese Patent Application Publication No. 2002-321609.

SUMMARY OF THE INVENTION

However, the aforementioned master cylinder is for compensating for the ineffective fluid amount during the initial stage of the stroke, and hence the predetermined hydraulic pressure is set within a low hydraulic-pressure region during the initial stage of the stroke. Therefore, the pedal stroke can be shortened only in a limited extent within the low hydraulic-pressure region. Accordingly, it is difficult to obtain a good pedal feel over a larger range.

The present invention has an object of providing a vehicle braking system and a master cylinder, which can provide a good pedal feel.

In order to achieve the aforementioned object, a vehicle braking system according to a first aspect of the present invention includes: a master cylinder including a small-diameter pressure chamber, a large-diameter pressurized chamber, and a pressure-reducing valve; a booster having a full-load point, for assisting an input of a brake pedal; detection means for detecting a failure of the booster; and pressure-intensifying means for compensating for a hydraulic pressure supplied to wheel cylinders with a hydraulic pressure generated by a hydraulic pressure source different form the master cylinder when the failure of the booster is detected by the detection means, in which the pressure-reducing valve is opened when a hydraulic pressure in the small-diameter pressure chamber is higher than a hydraulic pressure obtained with a pressing force applied to the brake pedal being 500 N.

A master cylinder according to a second aspect of the present invention includes: a small-diameter pressure chamber; a large-diameter pressurized chamber; and a pressure-reducing valve, in which the pressure-reducing valve is opened when a hydraulic pressure in the small-diameter pressure chamber is higher than a hydraulic pressure obtained with a pressing force applied to a brake pedal being 500 N.

A master cylinder according to a third aspect of the present invention includes: a small-diameter pressure chamber; a large-diameter pressurized chamber; and a pressure-reducing valve, in which the pressure-reducing valve is set so as to be opened when a hydraulic pressure in the small-diameter pressure chamber is higher than 2 MPa and lower than 10 MPa to make a hydraulic pressure in the large-diameter pressurized chamber equal to an atmospheric pressure along with an increase in hydraulic pressure after the pressure-reducing valve is opened.

DETAILED DESCRIPTION OF THE INVENTION

First Embodiment

Figure 1:
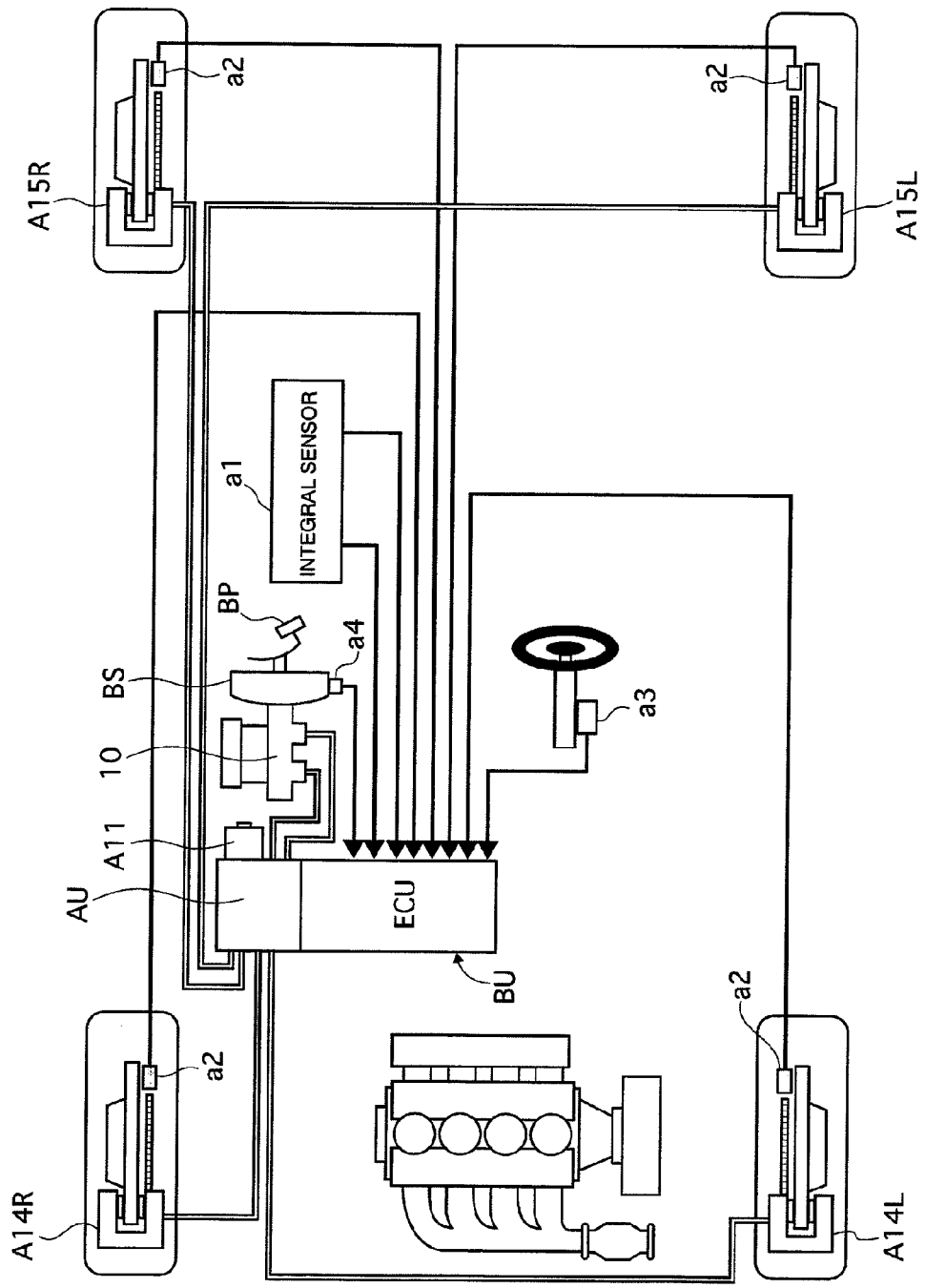
FIG. 1 is a system diagram illustrating an overall configuration of a first embodiment of the present invention.
Figure 2:
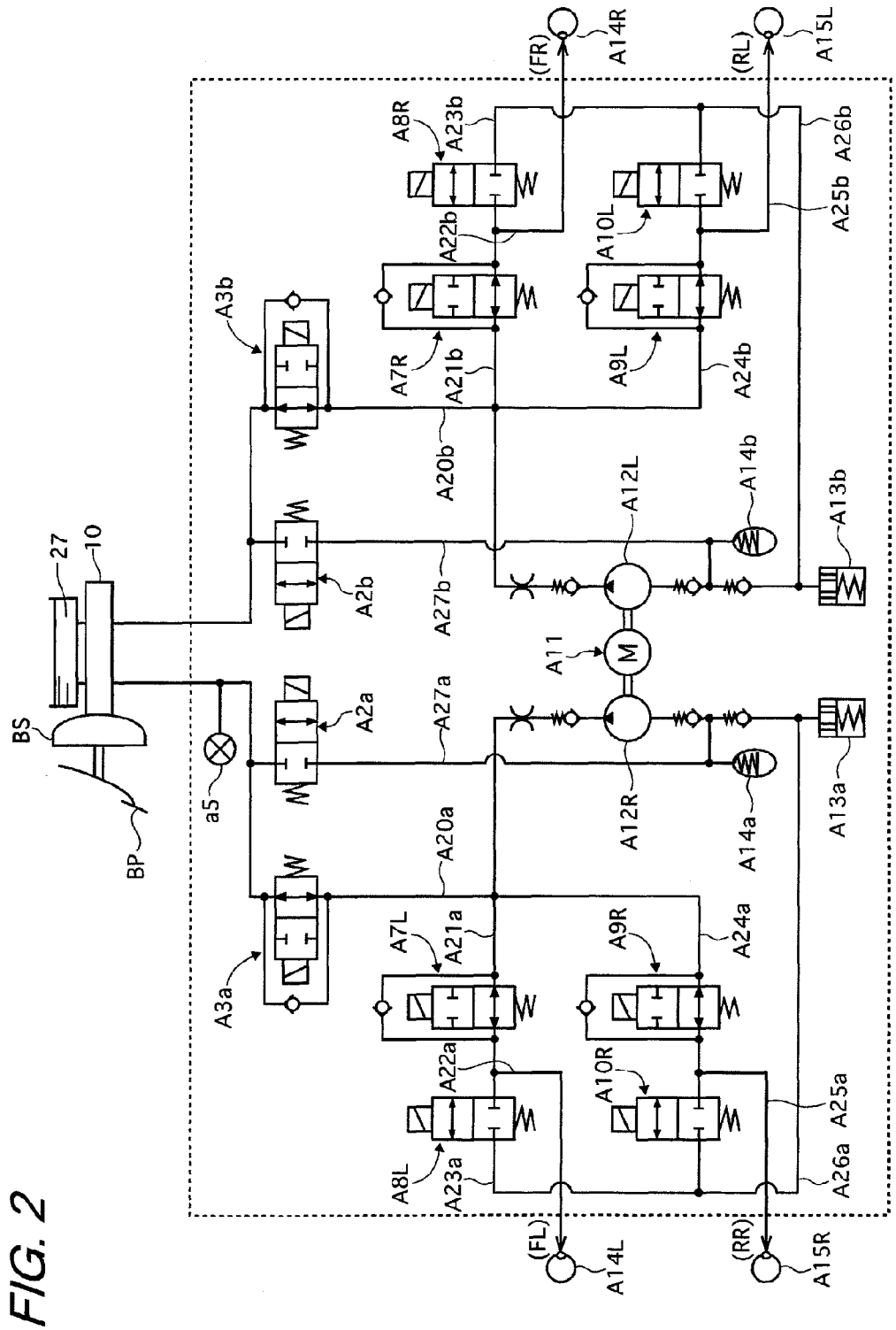
FIG. 2 is a view illustrating a circuit configuration of a brake control unit according to the first embodiment.

First, a configuration of a first embodiment is described referring to FIG. 1. A brake control unit BU according to the first embodiment includes: an integral sensor a1 which detects a yaw rate, a lateral acceleration, and a longitudinal acceleration of a vehicle; wheel-speed sensors a2; a steering-angle sensor a3 which detects a steering angle of a steering wheel steered by a driver; a negative-pressure sensor a4 which detects a negative pressure of a booster BS; and a hydraulic-pressure sensor a5 which detects a hydraulic pressure generated in a pressure chamber (small-diameter pressure chamber 61) of a master cylinder 10 (FIG. 2). The hydraulic pressure output from the brake control unit BU is supplied to wheel cylinders A14 (A14L, A14R) and A15 (A15L, A15R) of the respective wheels to achieve a desired braking force.

A pressing force input to a brake pedal BP operated by the driver is assisted by the booster BS, and the thus assisted piston-pushing force is transmitted to the master cylinder 10. Configurations of the booster BS and the master cylinder 10 are described below.

Sensor values detected by the various sensors are input to a control unit ECU which in turn outputs a drive signal to an actuator unit AU corresponding to a group of actuators, thereby controlling the drive of each of electromagnetic valves and a motor A11.

(Circuit Configuration of the Brake Control Unit BU)

FIG. 2 is a diagram illustrating a circuit configuration of the brake control unit BU. Each of the electromagnetic valves illustrated in this circuit diagram is in an initial state without energization. An A-system oil passage A20a and a B-system oil passage A20b are connected to the master cylinder 10 that generates a pressure by an operation of the brake pedal, which is performed by the driver. A basic configuration of the oil passage is the same for the A-system oil passage A20a and the B-system oil passage A20b. For distinction, the components of the A-system oil passage A20a and the components of the B-system oil passage A20b are denoted by the reference numerals with a or b, and L or R. Therefore, only the A-system is described below and the detailed description for the B-system is omitted.

The A-system oil passage A20a includes, from the master cylinder 10 regarded as the upstream side to the downstream side, the hydraulic-pressure sensor a5, a normally-open OUT-side gate valve A3a, and a pump A12R for discharging a brake fluid toward the upstream side. A front left wheel-system oil passage A21a is connected between the OUT-side gate valve A3a and the pump A12R. Similarly, a rear right wheel-system oil passage A24a is connected between the OUT-side gate valve A3a and the pump A12R.

A pump A12L similar to the pump A12R is provided in the B-system oil passage A20b, and these pumps are driven by a single motor A11. A normally-closed IN-side gate valve A2a and a diaphragm A14a are provided on an intake oil passage A27a in this order toward the downstream side. When plunger-type pumps are used as the pumps A12L and A12R, there is a fear in that a sufficient amount of brake fluid cannot be sucked during an intake stroke of each of the pumps in a low-temperature region. Therefore, the brake fluid is sucked from the master cylinder side during a discharge stroke of each of the pumps. In the subsequent intake stroke of each of the pumps, smooth intake from the diaphragms A14a and A14b respectively provided in proximity of the pumps is achieved.

On the front left wheel-system oil passage A21a, a normally-open front-wheel side ABS pressure-intensifying electromagnetic valve A7L is provided along with a bypass oil passage which allows a flow only on the upstream side. The front left-side wheel cylinder A14L is connected to the front left wheel-system oil passage A21a, through an oil passage A22a which branches from the front left wheel-system oil passage A21a. A first pressure-reducing oil passage A23a is connected to the front left wheel-system oil passage A21a on the downstream side of the oil passage A22a. On the first pressure-reducing oil passage A23a, a normally-closed front-wheel side ABS pressure-reducing electromagnetic valve A8L is provided.

On the rear right wheel-system oil passage A24a, a normally-open rear-wheel side ABS pressure-intensifying electromagnetic valve A9R is provided along with a bypass oil passage which allows a flow only on the upstream side. The rear right-side wheel cylinder A15R is connected to the rear right wheel-system oil passage A24a via an oil passage A25a which branches from the rear right wheel-system oil passage A24a. A second pressure-reducing oil passage A26a is connected to the rear right wheel-system oil passage A24a on the downstream side of the oil passage A25a. On the second pressure-reducing oil passage A26a, a normally-closed front-wheel side ABS pressure-reducing electromagnetic valve A10R and an ABS reservoir A13a on the downstream side of the electromagnetic valve A10R are provided.

The oil passages and the electromagnetic valves having the same configurations as those of the A-system are also provided in the B-system. Differences between the A-system and the B-system only lie in the reference symbols, that is, those with a or b and L or R, and hence the description of the B-system is herein omitted. In each control described below, the pumps A12L and A12R constitute pressure-intensifying means for compensating for the hydraulic pressures applied to the wheel cylinders A14 and A15 with the hydraulic pressure generated by a hydraulic pressure source different from the master cylinder 10, and are referred to as pump-up means below.

[Brake Assist Control Performed in a Sudden Braking Operation or the Like]

For Pressure Intensification

When the driver performs, for example, a pedal operation which results in a pedal pressing speed (estimated based on a rate of change in hydraulic pressure obtained by the hydraulic-pressure sensor a5) or a pedal pressing amount (estimated based on a hydraulic pressure value obtained by the hydraulic-pressure sensor a5) exceeding a preset reference value, the control unit ECU determines that sudden braking is being performed. Therefore, in such a case, the control unit ECU sets a target wheel cylinder hydraulic pressure so as to perform brake assist control. Namely, when a master cylinder hydraulic pressure is intensified by the operation of the brake pedal, which is performed by the driver, the same hydraulic pressure is exerted on the A-system oil passage A20a and the B-system oil passage A20b so that brake fluid is supplied to the front-wheel system oil passages A21a, A21b and the rear-wheel system oil passages A24a, A24b through an intermediation of the OUT-side gate valves A3a and A3b, respectively. Next, the hydraulic pressures in the front-wheel side wheel cylinders A14L and A14R are intensified from the oil passages A22a, A22b through an intermediation of the ABS pressure-intensifying electromagnetic valves A7L, A7R, whereas the hydraulic pressures in the rear-wheel side wheel cylinders A15L, A15R are intensified from the oil passages A24a and A24b through an intermediation of the ABS pressure-intensifying electromagnetic valves A9L, A9R.

At this time, the master cylinder hydraulic pressure is detected by the hydraulic-pressure sensor a5. If the detected master cylinder hydraulic pressure, which is generated only by the pressing force of the driver applied on the brake pedal, is insufficient and the target wheel cylinder hydraulic pressure is required to be ensured, the IN-side gate valves A2a and A2b are opened, whereas the OUT-side gate valves A3a and A3b of the A-system oil passage A20a are placed in a closed state. At the same time or almost at the same time, a necessary assist amount according to the master cylinder hydraulic pressure detected by the hydraulic-pressure sensor a5 is computed. The brake fluid is supplied from the master cylinder 10 through the intake oil passages A27a and A27b to the pumps A12L and A12R by drive of the motor according to the obtained assist amount. The hydraulic pressure, intensified by the pumps A12L and A12R to the target wheel cylinder hydraulic pressure, is supplied to the wheel cylinders A14 and A15, thereby implementing the brake assist control.

For Pressure Reduction

When the master cylinder hydraulic pressure is reduced, the pressures in the front-wheel side wheel cylinders A14L and A14R are reduced through the same path as that used for the pressure intensification. At this time, a quick pressure reduction is achieved through the bypass oil passages provided to the ABS pressure-intensifying electromagnetic valves A7L, A7R, A9L, and A9R. Moreover, the pressure reduction during the brake assist control is performed by reducing the amount of drive of the motor, and in addition, closing the IN-side gate valves A2a and A2b so as to stop the supply of the brake fluid. If the pressing force of the driver is so large in a normal braking operation that the wheels tend to be locked, ABS control is implemented by controlling the opening/closing of the ABS pressure-intensifying electromagnetic valves A7L, A7R, A9L, and A9R and the ABS pressure-reducing electromagnetic valves A8L, A8R, A10L, and A10R.

The aforementioned brake assist control can be performed not only in the sudden braking operation but also when control in case of failure of the booster is performed or the other setting conditions are satisfied.

The brake control unit BU including the pump-up means described above can perform various types of braking control such as:

(i) vehicle stability control for generating the braking force so as to stabilize a yaw rate when a behavior of the yaw rate in a destabilizing direction is detected based on a steering angle of the driver and the yaw rate, the lateral acceleration, or the forward and rearward acceleration, regardless of the operation of the brake pedal, which is performed by the driver;

(ii) traction control for generating a braking force to suppress a slip of a driving wheel when the slip of the driving wheel is detected, regardless of the operation of the brake pedal, which is performed by the driver; and (iii) automatic brake control for generating a necessary braking force regardless of whether or not the driver intends to perform braking when it is detected that a relative distance to an obstacle in front of a vehicle, which is detected by a laser radar or the like, becomes less than a set value.

However, the description of the aforementioned braking control is herein omitted.

[Functions when Control in Case of Failure of the Booster is Performed]

Next, functions when the brake control unit BU including the pump-up means is caused to function as the booster, in case of failure of the booster BS which characterizes the present invention are described. When the control unit ECU determines based on the negative-pressure sensor a4 that the booster BS has failed, the hydraulic pressure in the master cylinder 10, which indicates whether or not the driver intends to perform braking, is detected by the hydraulic-pressure sensor a5. A hydraulic pressure obtained by multiplying the detected hydraulic pressure by a predetermined boost ratio is set as the target wheel cylinder hydraulic pressure. The hydraulic pressure intensified by the pump-up means described above is supplied to the wheel cylinders A14 and A15. In this manner, the brake assist control is implemented so that the hydraulic pressure becomes equal to the target wheel cylinder hydraulic pressure.

(Configuration of the Booster)

Figure 3:
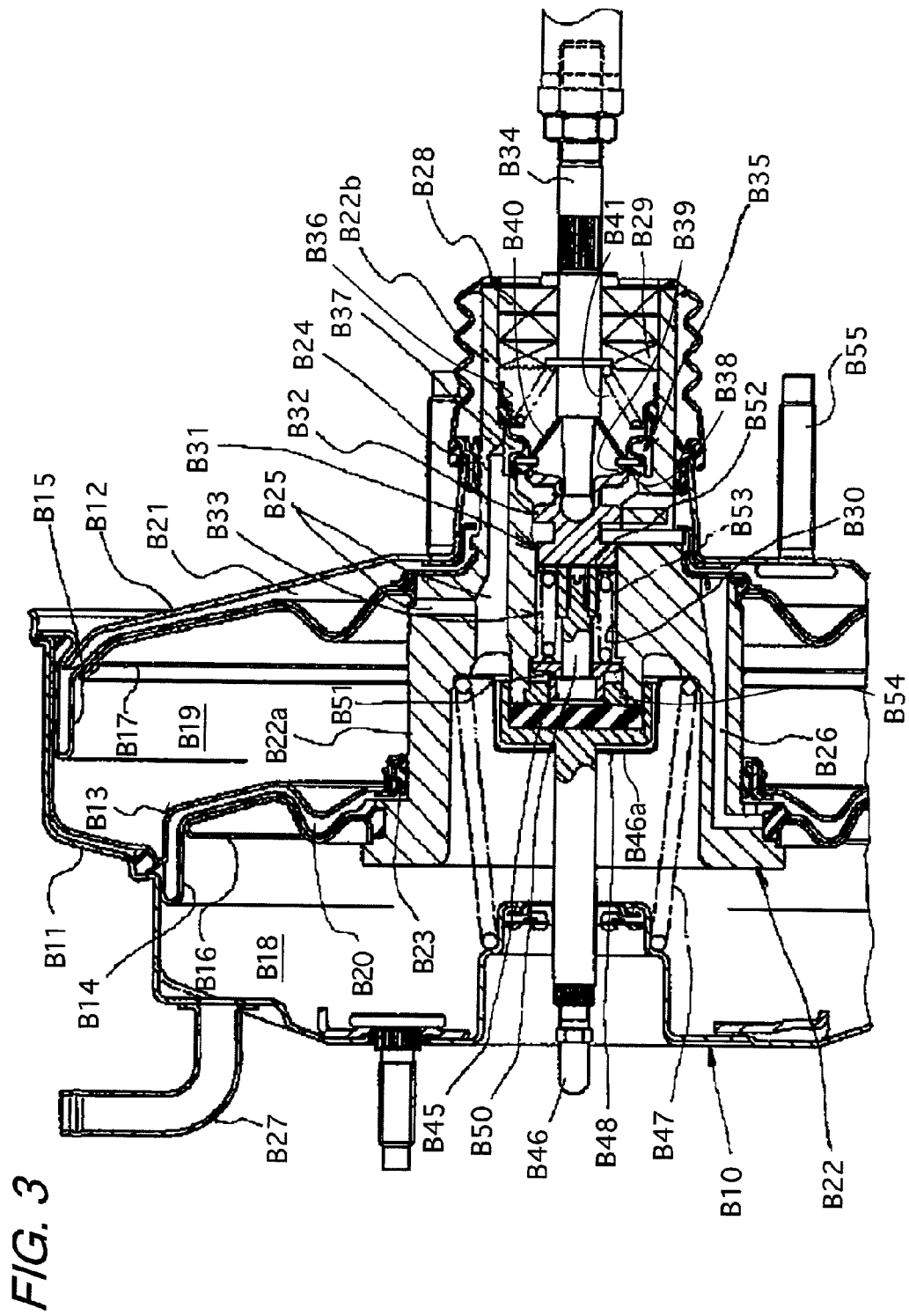
FIG. 3 is a sectional view illustrating a pneumatic booster according to the first embodiment.

FIG. 3 is a sectional view illustrating the pneumatic booster BS according to the first embodiment. The pneumatic booster BS is configured as a tandem type one. A shell main body B10 includes a front shell B11 and a rear shell B12. The interior of the shell main body B10 is partitioned by a center shell B13 into two chambers, i.e., a front chamber and a rear chamber. The front chamber is further partitioned into a constant-pressure chamber B18 and a variable-pressure chamber B20 by a power piston B16 including a diaphragm B14, whereas the rear chamber is further partitioned into a constant-pressure chamber B19 and a variable-pressure chamber B21 by a power piston B17 including a diaphragm B15. In the center of the power pistons B16 and B17, a valve body B22 continuously including a cup portion B22a having a large diameter and a cylindrical portion B22b having a small diameter is provided. The valve body B22 slidably passes through the center shell B13 and the rear shell 312 in an airtight manner through an intermediation of seal members B23 and B24 so that the cylindrical portion B22b extends backward beyond the rear shell B12.

The valve body B22 is provided with a constant-pressure passage (negative-pressure passage) B25, which brings the two constant-pressure chambers B18 and B19 into communication with each other and each of the constant-pressure chambers B18 and B19 into communication with the interior of the cylindrical portion B22b of the valve body B22; and an air passage (atmosphere passage) B26, which brings the two variable-pressure chambers B20 and B21 into communication with each other and each of the variable-pressure chambers B20 and B21 into communication with the interior of the cylindrical portion B22b of the valve body 22. For example, an engine negative pressure is introduced into the constant-pressure chamber B18 on the front side through an introduction pipe B27 connected to a front part of the front shell B11, whereas a silencer B28 and a filter B29 are provided on the opening side of the cylindrical portion B22b of the valve body B22.

Through a bottom of the cup portion B22a of the valve body B22, a stepped shaft hole B30 is provided. In the shaft hole B30, a plunger B31 is slidably provided. The plunger B31 includes a main body portion B32 on the rear side and a reaction-force receiving portion B33 on the front side, which is described below. An input shaft B34 which operates in cooperation with the brake pedal BP is connected to a rear end of the main body portion B32 of the plunger B31. A valve mechanism 35 for selectively opening the negative-pressure passage B25 and the atmosphere passage B26 with respect to the front-side variable-pressure chamber B20 and the rear-side variable-pressure chamber B21 is provided in the cylindrical portion B22b of the valve body B22.

The valve mechanism B35 includes an elastically deformable valve body B37, which is fixed onto an inner surface of the cylindrical portion B22b of the valve body B22 by using a presser member B36, at a proximal end of the valve body B37; a negative-pressure valve B38, which includes an outer edge portion of a front end of the valve body B37 and a valve seat portion formed on an inner periphery of the valve body B22 so as to include an opening of the negative-pressure passage B25; a breather valve B39, which includes an inner edge portion of the front end of the valve body B37 and a valve seat portion formed on a rear end of the main body portion B32 of the plunger B31; and a valve spring B40, which has an end which is engaged to the input shaft B34 so as to normally bias the valve body B37 in a direction that the negative-pressure valve B38 and the breather valve B39 are closed. The input shaft B34 is normally biased toward the brake pedal BP by a return spring B41 which has an end engaged to the presser member B36.

On the other hand, a proximal-end large-diameter portion B46a of an output shaft B46 is operably connected through a reaction disc B45 made of a rubber to the bottom of the cup portion B22a of the valve body B22. The proximal-end large-diameter portion B46a of the output shaft B46 has a cup-like shape. The reaction disc B45 is housed within the cup-like shaped portion of the proximal-end large-diameter portion B46a. A center portion of the reaction disc B45 is made to face the shaft hole B30 of the valve body B22. A return spring B47 for returning the power pistons B16 and B17 from operating positions back to non-operating positions (positions illustrated in FIG. 3) is provided in the front-side constant-pressure chamber B18. The proximal-end large-diameter portion B46a of the output shaft B46 is pressed against the valve body B22 by a spring seat B48 which receives an end of the return spring B47. A distal end of the output shaft B46 passes through the front shell B11 in an airtight manner so as to extend forward beyond the front shell B11. The master cylinder 10 is operably connected to the distal end of output shaft B46.

The reaction-force receiving portion B33 of the plunger B31 substantially includes: a shaft member B50 which is located on an axis of the valve body B22; a sleeve B51 which is slidably fitted over the shaft member B50; and a compression spring B53, an end of which is seated on a spring seat B52 fixed to a rear end of the shaft member B50 so that the sleeve B51 is biased forward with a predetermined set load.

On the other hand, an annular spacer B54 for guiding the sleeve B51 in a sliding manner is mounted into an open end portion of the shaft hole B30 of the valve body B22. Owing to the presence of the spacer B54, a diameter of a rear portion of the shaft hole B30, that is, a portion of the shaft bole B30 in which the compression spring B53 is housed, can be increased without increasing a maximum contact diameter of the reaction-force receiving portion B33 which is opposed to the reaction disc B45. As a result, the use of the compression spring B53 which has a correspondingly large effective diameter is enabled.

The aforementioned pneumatic booster BS is mounted to a vehicle body by using a plurality of stud bolts B55 which are provided vertically on a rear surface of the rear shell 12. The brake pedal BP is connected to the input shaft B34 while the booster BS is mounted in this state. When the brake pedal BP is pressed down while the booster BS is mounted in this state, the input shaft B34 and the main body portion B32 of the plunger B31 move forward, that is, to the left of FIG. 3, in an integrated manner. Then, the breather valve B39 is opened to allow the atmosphere to flow into the valve body B22 through the silencer B28 and the filter B29. The atmosphere passes through the atmosphere passage B26 to be introduced into the two variable-pressure chambers B21 and B20. As a result, a difference in pressure is generated between the constant-pressure chambers B18 and B19, into which the negative pressure has been introduced, and the variable-pressure chambers B20 and B21; to move the front power piston B16 and the rear power piston B17 forward. A thrust (output) of the movement of the power pistons B16 and B17 is transmitted to the output shaft B46 through the valve body B22 and the reaction disc B45 to perform a boost function.

When there is no longer a difference in pressure between the constant-pressure chambers B18, B19 and the variable-pressure chambers B20, B21, the booster BS reaches a full-load point at which the boost function cannot be demonstrated any more, that is, the assist force is no longer generated. After the booster BS reaches the full-load point, the pressing force applied to the brake pedal BP by the operation by the driver is directly reflected in the master cylinder hydraulic pressure without being boosted by the pneumatic booster BS. Although the tandem-type pneumatic booster BS is used as the booster in the first embodiment, a single-type pneumatic booster may also be used. Alternatively, a hydraulic booster using a hydraulic pressure generated by an electric pump or an engine-driven pump or an electric booster for obtaining a boosted force by a driving member driven by the electric motor may be used. When the hydraulic booster using the hydraulic pressure is used, the failure of the hydraulic booster is detected based on the hydraulic pressure generated by the electric pump, a driving current of the electric pump or the like. When the electric booster is used, the failure of the electric booster is detected based on a driving current of the electric motor, the amount of movement of the driving member or the like.

(Configuration of the Master Cylinder)

Figure 4:
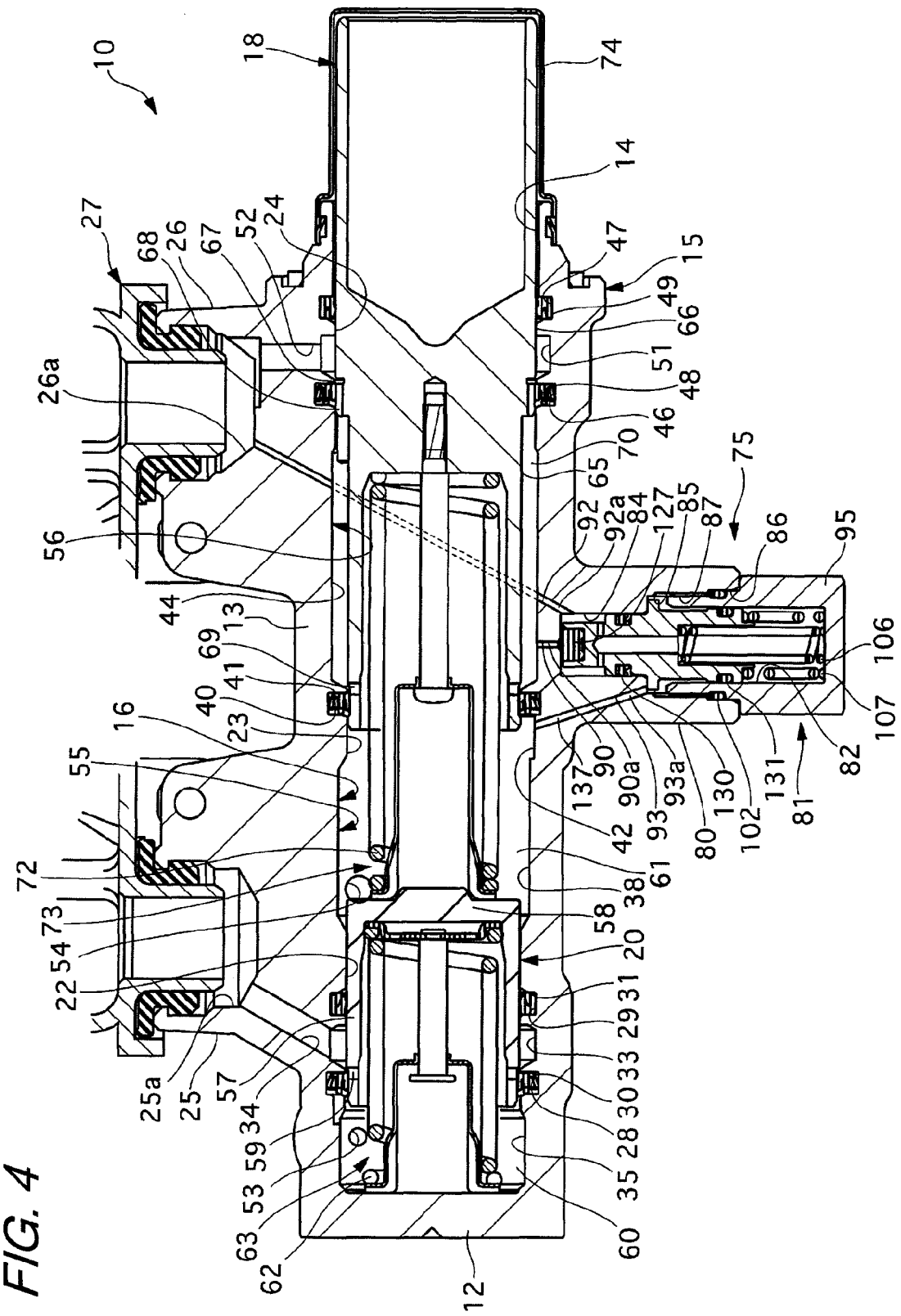
FIG. 4 is a sectional side view illustrating a master cylinder according to the first embodiment.
Figure 5:
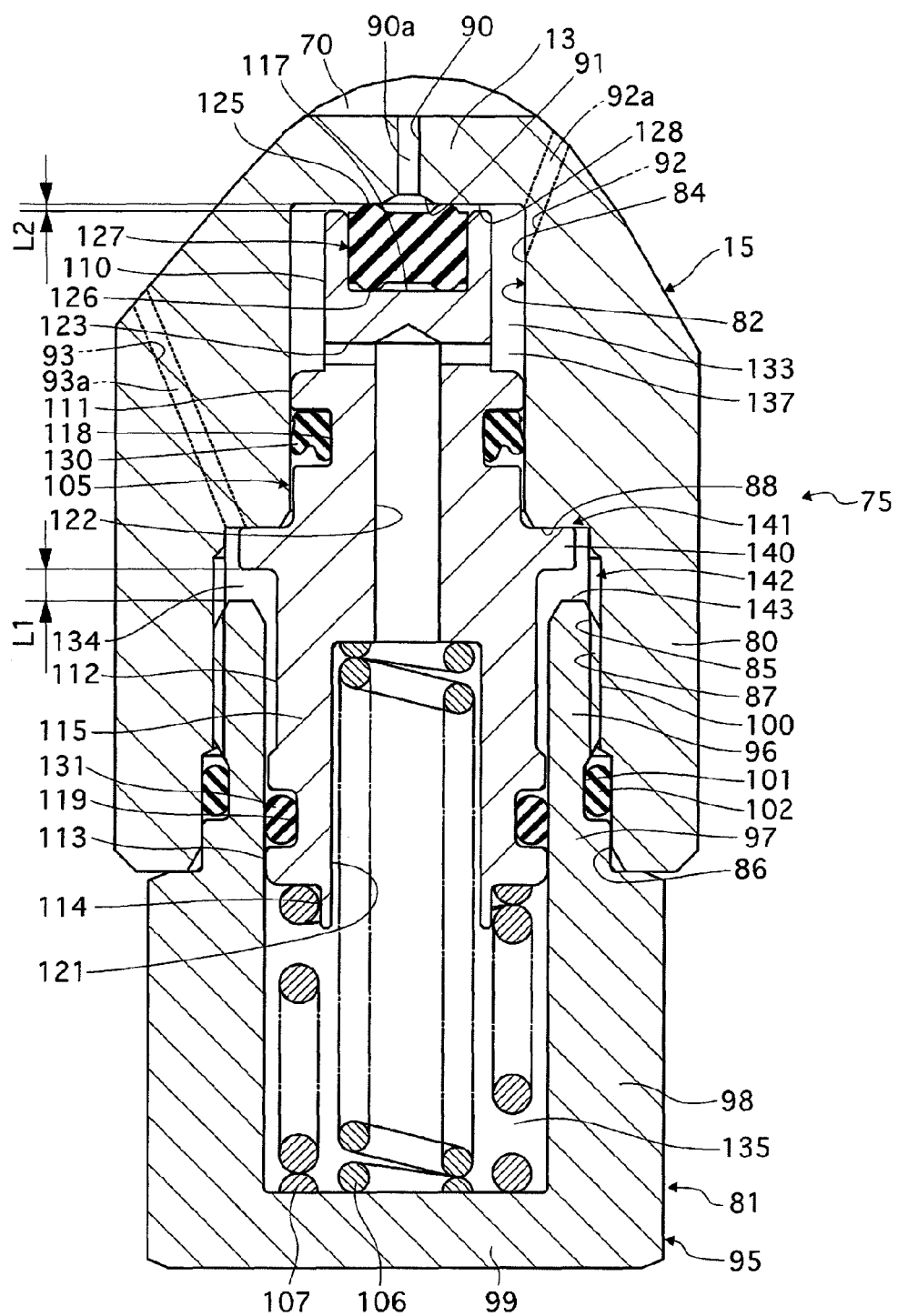
FIG. 5 is a partially enlarged sectional side view illustrating a control valve of the master cylinder according to the first embodiment.

FIG. 4 is a sectional side view illustrating the master cylinder 10 according to the first embodiment. FIG. 5 is a partially enlarged sectional side view illustrating a pressure-reducing valve of the master cylinder 10 according to the first embodiment.

The master cylinder 10 illustrated in FIG. 4 is a so-called plunger-type master cylinder. That is, the master cylinder 10 generates a hydraulic pressure of the brake fluid to be introduced into the wheel cylinders A14 and A15 by the pressurization with the output shaft B46 of the booster BS, which is moved by the operation of the brake pedal BP or the like.

The master cylinder 10 is a tandem-type master cylinder including: a cylinder body (stepped cylinder) 15, which includes a bottom portion 12 and a cylinder portion 13 to form a cylindrical shape with a closed end, and is mounted to the booster BS on an opening portion 14 side; a primary piston (stepped piston) 18, which includes a large-diameter piston portion 66 and a small-diameter piston portion 65, and is inserted into a bore 16 of the cylinder body 15 to be located on the opening portion 14 side so as to be slidable along an axis of the cylinder portion 13 (hereinafter, referred to as "a cylinder axis"); and a secondary piston 20, which is inserted into the bore 16 of the cylinder body 15 to be located on the bottom portion 12 side of the primary piston 18 so as to be slidable along the cylinder axis. In this first embodiment, it is assumed that the cylinder axis is horizontally arranged.

On the inner diameter side of the cylinder portion 13, a first small-diameter sliding inner-diameter portion 22 is formed on the bottom portion 12 side. A second small-diameter sliding inner-diameter portion 23 is formed in the middle. On the opening portion 14 side, a large-diameter sliding inner-diameter portion 24 having a larger diameter than those of the first small-diameter sliding inner-diameter portion 22 and the second small-diameter sliding inner-diameter portion 23 is formed. The sliding movement of the secondary piston 20 is always guided by the first small-diameter sliding inner-diameter portion 22. The sliding movement of the large-diameter piston portion 66 of the primary piston 18 is always guided by the large-diameter sliding inner-diameter portion 24, whereas the sliding movement of the small-diameter piston portion 65 is always guided by the second small-diameter sliding inner-diameter portion 23.

Two mount portions 25, 26 are integrally formed with the cylinder body 15 so as to extend from the cylinder portion 13 in a radially outward direction of the cylinder portion 13 (hereinafter, referred to as "a cylinder radial direction"), more specifically, to project upward. The mount portions 25, 26 are formed at the same positions in a circumferential direction of the cylinder portion 13 (hereinafter, referred to as "a cylinder circumferential direction") so as to be separated from each other in the cylinder axis direction. A reservoir 27 is mounted into mount holes 25a and 26a respectively formed in the mount portions 25 and 26.

Annular seal circumferential grooves 28 and 29, each being concaved outward in the cylinder radial direction, are formed on the first small-diameter sliding inner-diameter portion 22 of the cylinder body 15. The annular seal circumferential grooves 28 and 29 are formed at a plurality of, more specifically, two positions in this order from the bottom portion 12 side at a distance from each other in the cylinder axis direction. A seal ring 30 constituted by a cup seal having an E-like cross section is fitted into the seal circumferential groove 28 on the bottom portion 12 side so that a lip of the seal ring 30 is located on the bottom portion 12 side. A seal ring 31 constituted by a cup seal having a C-like cross section is fitted into the seal circumferential groove 29 on the opening portion 14 side so that a lip of the seal ring 31 is located on the opening portion 14 side.

An annular opening groove 33, which is concaved outward in the cylinder radial direction, is formed on the first small-diameter sliding inner-diameter portion 22 between the seal circumferential grooves 28 and 29. The opening groove 33 is brought into communication with a communication hole 34 which is open to the mount hole 25a on the bottom portion 12 side so as to be constantly in communication with the reservoir 27. A bottom-side large-diameter inner-diameter portion 35 having a slightly larger diameter than that of the first small-diameter sliding inner-diameter portion 22 is formed in the cylinder body 15 on the bottom portion 12 side of the seal circumferential groove 28.

An intermediate large-diameter inner-diameter portion 38 having a slightly larger diameter than those of the first small-diameter sliding inner-diameter portion 22 and the second small-diameter sliding inner-diameter portion 23 is formed in the cylinder body 15 between the first small-diameter sliding inner-diameter portion 22 and the second small-diameter sliding inner-diameter portion 23.

An annular seal circumferential groove 40, which is concaved outward in the cylinder radial direction, is formed on the second small-diameter sliding inner-diameter portion 23. A seal ring 41 constituted by a cup seal having an E-like cross section is fitted into the seal circumferential groove 40 so that a lip of the seal ring 41 is located on the bottom portion 12 side.

An eccentric groove 42 for linking the seal circumferential groove 40 and the intermediate large-diameter inner-diameter portion 38 to each other is formed on the second small-diameter sliding inner-diameter portion 23 on the intermediate large-diameter inner-diameter portion 38 side so as to be concaved outward in the cylinder radial direction. The eccentric groove 42 has a circular arc-like profile which has a diameter smaller than that of the second small-diameter sliding inner-diameter portion 23 and an axis parallel to the second small-diameter sliding inner-diameter portion 23 as a center.

An opening-side large-diameter inner-diameter portion 44 having a larger diameter than those of the second small-diameter sliding inner-diameter portion 23, the large-diameter sliding inner-diameter portion 24, the bottom-side large-diameter inner-diameter portion 35, and the intermediate large-diameter inner-diameter portion 38 is formed in the cylinder body 15 between the second small-diameter sliding inner-diameter portion 23 and the large-diameter sliding inner-diameter portion 24.

Annular seal circumferential grooves 46 and 47, each being concaved outward in the cylinder radial direction, are formed on the large-diameter sliding inner-diameter portion 24 of the cylinder body 15. The annular seal circumferential grooves 46 and 47 are formed at a plurality of, more specifically, two positions in this order from the bottom portion 12 side at a distance from each other in the cylinder axis direction. A seal ring 48 constituted by a cup seal having an E-like cross section is fitted into the seal circumferential groove 46 on the bottom portion 12 side so that a lip of the seal ring 48 is located on the bottom portion 12 side. A seal ring 49 constituted by a cup seal having a C-like cross section is fitted into the seal circumferential groove 47 on the opening portion 14 side so that a lip of the seal ring 49 is located on the bottom portion 12 side.

An annular opening groove 51, which is concaved outward in the cylinder radial direction, is formed on the large-diameter sliding inner-diameter portion 24 between the seal circumferential grooves 46 and 47. The opening groove 51 is brought into communication with a communication hole 52 which is open to the mount hole 26a on the opening portion 14 side so as to be constantly in communication with the reservoir 27.

On a lateral portion of the cylinder portion 13 of the cylinder body 15, a secondary discharge path 53 and a primary discharge path 54, to which brake pipes for supplying the brake fluid to the wheel cylinders A14 and A15 are attached, are formed.

In the cylinder body 15, the bottom-side large-diameter inner-diameter portion 35, the first small-diameter sliding inner-diameter portion 22, the intermediate large-diameter inner-diameter portion 38, and the second small-diameter sliding inner-diameter portion 23 constitute a small-diameter cylinder portion 55; whereas the opening-side large-diameter inner-diameter portion 44 and the large-diameter sliding inner-diameter portion 24 constitute a large-diameter cylinder portion 56, which has a larger diameter than that of the small-diameter portion 55 as a whole.

The secondary piston 20, which is fitted into the bottom portion 12 side of the cylinder body 15, has a cylindrical shape with a closed end. Specifically, the secondary piston 20 includes a cylindrical portion 57 and a bottom portion 58 formed on one axial side of the cylindrical portion 57. The secondary piston 20 is slidably fitted into the first small-diameter sliding inner-diameter portion 22 of the cylinder body 15 while the cylindrical portion 57 thereof is located on the bottom portion 12 side. A plurality of ports 59, each of which extends through an end of the cylindrical portion 57 opposite to the bottom portion 58 in the cylinder radial direction, are formed radially.

A portion surrounded by the bottom portion 12 of the cylinder body 15, a part of the cylinder portion 13, which is situated on the bottom portion 12 side, and the secondary piston 20 so as to be sealed by the seal ring 30 forms a secondary hydraulic chamber 60 for supplying the hydraulic pressure to the secondary discharge path 53. When the secondary piston 20 is located at a position which allows the ports 59 to be opened to the opening groove 33, the secondary hydraulic chamber 60 is brought into communication with the reservoir 27.

An inner circumference of the seal ring 30 provided in the seal circumferential groove 28 formed on the cylinder body 15 on the bottom portion 12 side is brought into sliding contact with the outer circumferential side of the secondary piston 20. Therefore, in the state where the secondary piston 20 causes the ports 59 to be located on the bottom portion 12 side of the seal ring 30, the communication between the secondary hydraulic chamber 60 and the reservoir 27 can be interrupted by the sel ring 30. When a difference in pressure is generated between the secondary hydraulic chamber 60 and the reservoir 27, the seal ring 30 allows the brake fluid to flow only from the reservoir 27 toward the secondary hydraulic chamber 60. An inner circumference of the seal ring 31 provided in the seal circumferential groove 29 of the cylinder body 15 is brought into sliding contact with the outer circumferential side of the secondary piston 20 so that the communication between the opening groove 33, which is in communication with the reservoir 27, and the primary hydraulic chamber (small-diameter pressure chamber) 61 described below is interrupted.

A space adjusting portion 63 including a secondary piston spring 62, which determines a space between the bottom portion 58 of the secondary piston 20 and the bottom portion 12 of the cylinder body 15 in a standby state where there is no input from the booster BS, is provided between the bottom portion 58 and the bottom portion 12.

The primary piston 18 fitted to the opening portion 14 of the cylinder body 15 has a stepped outer profile. That is, a part of the primary piston 18, which is on one side in the axial direction, is a small-diameter piston portion 65, whereas the remaining part of the primary piston 18, which is on the opposite side in the axial direction, is a large-diameter piston portion 66 having a larger diameter than the small-diameter piston portion 65. Each of the two axial ends has a cylindrical shape. An annular groove 67 is formed on the large-diameter piston portion 66 on the side close to the small-diameter piston portion 65. A plurality of communication grooves 68 extending along the axial direction are formed on the large-diameter piston portion 66 on the small-diameter piston portion 65 side of the annular groove 67. As described above, the small-diameter piston portion 65 of the primary piston 18 is slidably inserted into the second small-diameter sliding inner-diameter portion 23 of the small-diameter cylinder portion 55 of the cylinder body 15, while the large-diameter piston portion 66 thereof is slidably inserted into the large-diameter sliding inner-diameter portion 24 of the large-diameter cylinder portion 56 of the cylinder body 15.

A plurality of ports 69 extending in the radial direction are formed radially in a cylindrical portion at an end of the small-diameter portion 65 of the primary piston 18, which is on the side opposite to the large-diameter piston portion 66.

A portion surrounded by a part of the cylinder body 15, which is situated between the first small-diameter sliding inner-diameter portion 22 and the second small-diameter sliding inner-diameter portion 23, the primary piston 18, and the secondary piston 20 so as to be sealed by the seal rings 31 and 41 forms the primary hydraulic chamber (small-diameter pressure chamber) 61 situated on the small-diameter piston portion 65 side. The primary hydraulic chamber 61 supplies the hydraulic pressure to the primary discharge path 54. A portion surrounded by a part of the cylinder body 15, which is situated between the second small-diameter sliding inner-diameter portion 23 and the large-diameter sliding inner-diameter portion 24, and the primary piston 18 so as to be sealed by the seal rings 41 and 48 forms a large-diameter pressurized chamber 70 situated on the large-diameter piston portion 66 side. The large-diameter pressurized chamber 70 has a larger diameter than that of the primary hydraulic chamber 61. In other words, the primary piston 18 partitions the interior of the cylinder body 15 into the large-diameter pressurized chamber 70 and the primary hydraulic chamber 61. When the primary piston 18 is at the position which causes the ports 69 to be opened to the large-diameter pressurized chamber 70, the primary hydraulic chamber 61 is brought into communication with the large-diameter pressurized chamber 70.

An inner circumference of the seal ring 41 provided to the second small-diameter sliding inner-diameter portion 23 of the cylinder body 15 is brought into sliding contact with the outer circumferential side of the primary piston 18. Therefore, when the primary piston 18 is at the position which causes the ports 69 to be situated on the bottom portion 12 side of the seal ring 41, the communication between the primary hydraulic chamber 61 and the large-diameter pressurized chamber 70 can be interrupted. Moreover, because the seal ring 41 is the cup seal, the interior of the cylinder body 15 is partitioned into the large-diameter pressured chamber 70 on the large-diameter piston portion 66 side and the primary hydraulic chamber 61 on the small-diameter piston portion 65 side. In addition, when a difference in pressure is generated between the large-diameter pressurized chamber 70 and the primary hydraulic chamber 61, the seal ring 41 allows the brake fluid to flow only from the large-diameter pressurized chamber 70 toward the primary hydraulic chamber 61.

An inner circumference of the seal ring 48 provided in the seal circumferential groove 46 is brought into sliding contact with the outer circumferential side of the large-diameter piston portion 66 of the primary piston 18. When the primary piston 18 is at the position which causes the communication groove 68 and the annular groove 67 to be situated on the bottom portion 12 side of the seal ring 48, the communication between the large-diameter pressurized chamber 70 and the communication hole 52, that is, the reservoir 27, can be interrupted. Similarly to the seal ring 41, the seal ring 48 is the cup seal. Therefore, when a difference in pressure is generated between the large-diameter pressurized chamber 70 and the reservoir 27, the seal ring 48 allows the brake fluid to flow only from the reservoir 27 toward the large-diameter pressurized chamber 70 through the opening groove 51 and the communication hole 52.

The seal ring 49 provided in the seal circumferential groove 47 on the opening portion 14 side is brought into sliding contact with the large-diameter piston portion 66 of the primary piston 18 to interrupt the communication between the communication hole 52, that is, the reservoir 27, and outside air through a gap between the inner circumference of the cylinder body 15 and the outer circumference of the primary piston 18.

A space adjusting portion 73 including a primary piston spring 72, which determines a space between the secondary piston 20 and the primary piston 18 in a standby state where there is no input from the brake pedal BP, is provided between the secondary piston 20 and the primary piston 18. A portion of the primary piston 18, which projects from the cylinder body 15, is covered with a cover 74 which is locked to an outer circumference of the opening portion 14 of the cylinder body 15.

The cylinder body 15 is constituted by the bottom portion 12, the cylinder portion 13, and the mount portions 25 and 26 which are formed from an integrally-molded material such as a metal cast product, for example, an aluminum cast product.

The secondary piston 20 is located at an initial position, which is the most distant from the bottom portion 12, by a biasing force of the secondary piston spring 62 of the space adjusting portion 63, when the secondary piston 20 is in an initial state where there is no input from the brake pedal BP (hereinafter, the position of each of the components in this state is referred to as an "initial position"). At this time, the secondary piston 20 causes the ports 59 to be opened to the opening groove 33. As a result, the secondary piston 20 brings the secondary hydraulic chamber 60 into communication with the reservoir 27 through the communication hole 34.

When the secondary piston 20 moves from this state toward the bottom portion 12 side by the input on the brake pedal; the ports 59 of the secondary piston 20 are closed by the seal ring 30. As a result, the communication between the secondary hydraulic chamber 60 and the reservoir 27 is interrupted, which in turn further moves the secondary piston 20 closer to the bottom portion 12 side. In this manner, the brake fluid is supplied from the secondary hydraulic chamber 60 through the secondary discharge path 53 to a brake device. Even in the state where the ports 59 are closed, when the hydraulic pressure in the secondary hydraulic chamber 60 becomes lower than the hydraulic pressure (atmospheric pressure) in the reservoir 27, the seal ring 30 is opened to allow the brake fluid in the reservoir 27 to flow into the secondary hydraulic chamber 60.

When the primary piston 18 is located at the initial position which is the closest to the opening portion 14 side by the biasing force of the secondary piston spring 62 of the space adjusting portion 63 and the biasing force of the primary piston spring 72 of the space adjusting portion 73, the primary piston 18 opens the ports 69 which are in communication with the primary hydraulic chamber 61 so as to bring the primary hydraulic chamber 61 and the large-diameter pressurized chamber 70 into communication with each other.

When the primary piston 18 is moved from this state toward the bottom portion 12 by the input on the brake pedal, the ports 69 of the primary piston 18 are closed by the seal ring 41 to interrupt the communication between the primary hydraulic chamber 61 and the large-diameter pressurized chamber 70 through the ports 69. When the primary piston 18 is further moved from this state toward the bottom portion 12, the brake fluid is supplied from the primary hydraulic chamber 61 through the primary discharge path 54 to the brake device. Even in the state where the ports 69 are closed, if the hydraulic pressure in the large-diameter pressurized chamber 70 becomes higher than that in the primary hydraulic chamber 61, the seal ring 41 is opened to allow the brake fluid in the large-diameter pressurized chamber 70 to flow into the primary hydraulic chamber 61.

When being located at the initial position, the primary piston 18 brings the large-diameter pressurized chamber 70 and the reservoir 27 into communication with each other through the communication groove 68, the annular groove 67, the opening groove 51, and the communication hole 52. When the primary piston 18 in this state slides toward the bottom portion 12, the communication groove 68 and the annular groove 67 are closed by the seal ring 48 to interrupt the communication between the large-diameter pressurized chamber 70 and the reservoir 27. When the primary piston 18 further slides toward the bottom portion 12, the large-diameter piston portion 66 reduces a volume of the large-diameter pressurized chamber 70 to increase the hydraulic pressure in the large-diameter pressured chamber 70. As a result, the seal ring 41 provided between the large-diameter pressurized chamber 70 and the primary hydraulic chamber 61 is opened to supply the brake fluid from the large-diameter pressurized chamber 70 to the primary hydraulic chamber 61. For supplying the brake fluid to the brake device, so-called fast fill for supplying a large volume of brake fluid during an initial stage of the operation as described above is performed so as to compensate for an ineffective fluid amount in an initial stage of a stroke, thereby shortening a pedal stroke.

In the master cylinder 10 according to the first embodiment, it is desirable to gradually release the hydraulic pressure in the large-diameter pressurized chamber 70 along with the fluid supply to the primary hydraulic chamber 61 at the time of fast fill described above. For this purpose, a control valve 75 is provided so as to be incorporated into the cylinder body 15. The control valve 75 is connected to the large-diameter pressurized chamber 70, the primary hydraulic chamber 61, and the reservoir 27, and corresponds to an example of the pressure-reducing valve for allowing the hydraulic pressure in the large-diameter pressurized chamber 70 to escape to the reservoir 27 so that the hydraulic pressure in the large-diameter pressurized chamber 70 is gradually reduced according to a predetermined increase in hydraulic pressure in the primary hydraulic chamber 61 when the hydraulic pressure in the large-diameter pressured chamber 70 or the primary hydraulic chamber 61 reaches a predetermined hydraulic pressure.

Specifically, a projecting portion 80 is formed on the cylindrical body 15. The projecting portion 80 is formed at an intermediate position of the cylinder portion 13 in the cylinder axial direction, more specifically, a position situated between the two mount portions 25 and 26 so as to project downward along the cylinder radial direction to form an approximately cylindrical shape. The projecting portion 80 is also integrally formed with the bottom portion 12, the cylinder portion 13, and the mount portions 25 and 26 at the time of casting of the cylinder body 15.

Along with a part of the cylinder portion 13, which is present inside the projecting portion 80, the projecting portion 80 constitutes a control cylinder 81 of the control valve 75. Inside the projecting portion 80, a stepped valve accommodating hole 82 with a closed end is formed. The valve accommodating hole 82 includes: a small-diameter hole portion 84, which is provided on the cylinder 13 side; an intermediate-diameter hole portion 85, which has a larger diameter than that of the small-diameter hole portion 84 and is adjacent to the small-diameter hole portion 84 on the side opposite to the cylinder portion 13; and a large-diameter hole portion 86, which has a larger diameter than that of the intermediate-diameter hole portion 85 and is adjacent to the intermediate-diameter hole portion 85 on the side opposite to the small-diameter hole portion 84. A female thread portion 87 is formed on the intermediate-diameter hole portion 85 except for a part situated on the small-diameter hole portion 84 side.

A pressurized-chamber communication hole 90 having a smaller diameter than that of the small-diameter hole portion 84 is formed at the position on the inner side of the projecting portion 80 at the cylinder portion 13 of the cylinder body 15, that is, in a part constituting the control cylinder 81. The pressurized-chamber communication hole 90 has one end which is open to the opening-side large-diameter inner-diameter portion 44 and the other end which is open to the center of a bottom portion of the small-diameter hole portion 84 so as to bring the small-diameter hole portion 84 into communication with the large-diameter pressurized chamber 70. The pressurized-chamber communication hole 90 is formed coaxially with the valve accommodating hole 82. The inner side of the pressured-chamber communication hole 90 forms a large-diameter pressurized chamber passage 90a with which the large-diameter pressurized chamber 70 is brought into communication in the control cylinder 81. As illustrated in FIG. 5, at an end of the pressured-chamber communication hole 90 on the small-diameter hole portion 84 side, a tapered chamfered portion 91 having a diameter increasing toward the small-diameter hole portion 84 is formed.

Moreover, as illustrated in FIG. 4, a reservoir communication hole 92 having a smaller diameter than that of the small-diameter hole portion 84 is formed in the projecting portion 80, the cylinder portion 13, and the mount portion 26. An end of the reservoir communication hole 92 is open to an end of a lateral wall of the small-diameter hole portion 84 on the bottom side, whereas the other end thereof is open to the bottom of the mount hole 26a of the mount portion 26, thereby bringing the small-diameter hole portion 84 into communication with the reservoir 27. The inner side of the reservoir communication hole 92 forms a reservoir passage 92a in the control cylinder 81, with which the reservoir 27 is brought into communication.

A hydraulic-chamber communication hole 93 having a smaller diameter than that of the small-diameter hole portion 84 is formed in the projecting portion 80 and the cylinder portion 13. One end of the hydraulic-chamber communication hole 93 is open to an end of a step portion 88 in the intermediate-diameter hole portion 85 on the lateral wall side, the step portion 88 being on the small-diameter hole portion 84 side in the intermediate-diameter hole portion 85, whereas the other end of the hydraulic-chamber communication hole 93 is open to a bottom of the eccentric groove 42, thereby bringing the intermediate-diameter hole portion 85 into communication with the primary hydraulic chamber 61. The inner side of the hydraulic-chamber communication hole 93 forms a hydraulic chamber passage 93a in the control cylinder 81, with which the primary hydraulic chamber 61 is brought into communication.

An opening of the aforementioned valve accommodating hole 82 is closed by a lid body 95 constituting a part of the control cylinder 81 of the control valve 75 as shown in FIG. 5. The lid body 95 is formed into a stepped approximately cylindrical shape with a closed end, including: a small-diameter cylinder portion 96; an intermediate-diameter cylinder portion 97, which is coaxial with the small-diameter cylinder portion 96 and has the same inner diameter as that of the small-diameter cylinder portion 96, but has a larger outer diameter than that of the small-diameter cylinder portion 96; a large-diameter cylinder portion 98, which is coaxial with the intermediate-diameter cylinder portion 97 and has the same inner diameter as that of the intermediate-diameter cylinder portion 97, but has a larger outer diameter than that of the intermediate-diameter cylinder portion 97; and a bottom portion 99, which closes the side of the large-diameter cylinder portion 98, which is opposite to the intermediate-diameter cylinder portion 97. A male thread portion 100 is formed on an outer circumferential portion of the small-diameter cylinder portion 96. An annular seal groove 101 is formed in an outer circumferential portion of the intermediate-diameter cylinder portion 97 on the small-diameter cylinder portion 96 side. The male thread portion 100 of the small-diameter cylinder portion 96 of the lid body 95 is threadably mounted into the female thread portion 87 of the intermediate-diameter hole portion 85 of the projecting portion 80 until a level-difference surface of the large-diameter cylinder portion 98 on the intermediate-diameter cylinder portion 97 side is brought into abutment against an open end face of the projecting portion 80, whereby the lid body 95 closes the valve accommodating hole 82. An O-ring 102 for sealing a gap between the valve accommodating hole 82 and the lid body 95 is fitted into the seal groove 101.

The control valve 75 includes a control piston 105 and two valve springs, that is, a valve spring 106 and a valve spring 107 which bias the control piston 105 toward the cylinder portion 13. The control piston 105 and the valve springs 106 and 107 are provided in a space formed by the cylinder portion 13, the projecting portion 80, and the lid body 95, specifically, a space in the control cylinder 81.

The control piston 105 includes a piston main body 115 made of a metal such as aluminum. The piston main body 115 includes: a first shaft portion 110; a second shaft portion 111 having a larger diameter than that of the first shaft portion 110, the second shaft portion 111 being adjacent to and coaxial with the first shaft portion 110; a third shaft portion 112 having a slightly larger diameter than that of the second shaft portion 111, the third shaft portion 112 being adjacent to the second shaft portion 111 on the side opposite to the first shaft portion 110 and being coaxial with the second shaft portion 111; a fourth shaft portion 113 having a larger diameter than that of the third shaft portion 112, the fourth shaft portion 113 being adjacent to the third shaft portion 112 on the side opposite to the second shaft portion 111 and being coaxial with the third shaft portion 112; and a fifth shaft portion 114 having a smaller diameter than that of the fourth shaft portion 113, which is adjacent to the fourth shaft portion 113 on the side opposite to the third shaft portion 112 and is coaxial with the fourth shaft portion 113.

As illustrated in FIG. 5, the second shaft portion 111 of the piston main body 115 is slidably fitted into the small-diameter hole portion 84 of the valve accommodating hole 82 constituting a part of an inner circumferential surface of the control cylinder 81, whereas the fourth shaft portion 113 thereof is fitted so as to be slidable on an inner circumferential surface of the lid body 95 constituting a part of the inner circumferential surface of the control cylinder 81. A seal concave portion 117 is formed in the center of a distal end of the first shaft portion 110 of the piston main body 115. In addition, a seal groove 118 is formed on the outer diameter side of the second shaft portion 111, whereas a seal groove 119 is formed on the outer diameter side of the fourth shaft portion 113. In the center of the piston main body 115, a large-diameter shaft hole 121 is formed through the fifth shaft portion 114 and the fourth shaft portion 113 to a middle position of the third shaft portion 112. A small-diameter shaft hole 122 having a smaller diameter than that of the large-diameter shaft hole 121 is formed from the middle position of the third shaft portion 112 through the second shaft portion 111 to a middle position of the first shaft portion 110. A hole 123 perpendicular to shaft is formed so as to perpendicularly cross the small-diameter shaft hole 122. The hole 123 perpendicular to shaft is open to an outer circumferential surface of the first shaft portion 110.

The control piston 105 includes a cylindrical columnar valve seal 127 made of a rubber. Annular projections 125 and 126 are respectively formed on opposite axial end faces of the valve seal 127. The valve seal 127 is fitted into the seal concave portion 117 of the piston main body 115. While the valve seal 127 is fitted into the seal concave portion 117 so as to be held in the fitted state, the projection 125, which is provided so as to be oriented to the outside, projects outward in the axial direction beyond a distal end of the piston main body 115. The projection 125 abuts against a bottom surface of the small-diameter hole portion 84 so as to surround the chamfered portion 91 of the pressurized-chamber communication hole 90 over an entire circumference thereof. In this manner, the valve seal 127 opens and closes the large-diameter pressurized chamber passage 90a. The bottom surface of the small-diameter hole portion 84 serves as a valve seat 128 with and from which the valve seal 127 is brought into contact and is separated at the time of closing and opening of the large-diameter pressurized chamber passage 90a. The hydraulic pressure of the large-diameter pressurized chamber 70 is applied to a space surrounded by the projection 125 of the valve seal 127 and the valve seat 128 against which the projection 125 abuts, thereby generating a thrust for biasing the control piston 105 in a valve-opening direction.

The control piston 105 further includes a seal ring 130 and an O-ring 131. The seal ring 130 is fitted into the seal groove 118 of the second shaft portion 111, whereas the O-ring 131 is fitted into the seal groove 119 of the fourth shaft portion 113. The seal ring 130 consists of a cup seal having a C-like cross section and is fitted into the seal groove 118 so that a lip thereof is located on the third shaft portion 112 side. The seal ring 130 seals a gap between the second shaft portion 111 and the small-diameter hole portion 84, whereas the O-ring 131 seals a gap between the fourth shaft portion 113 and the inner circumferential surface of the lid body 95.

A valve chamber 133, a control pressure chamber 134, and a chamber 135 are defined in the control cylinder 81 by the piston main body 115, the seal ring 130, and the O-ring 131, which constitute the control piston 105. The valve chamber 133 is formed on the valve seat 128 side in the axial direction. The valve chamber 133 is constantly in communication with the reservoir passage 92a. Switching between the communication with the large-diameter pressurized chamber passage 90a and the interruption thereof is performed by the valve seal 127 and the valve seat 128. The control pressure chamber 134 which is constantly in communication with the hydraulic pressure chamber passage 93a is formed in the middle of the control cylinder 81 in the axial direction. The chamber 135 is formed on the side opposite to the valve seat 128 in the axial direction. The reservoir passage 92a, the valve chamber 133, and the large-diameter pressurized chamber passage 90a constitute a communication path 137 for bringing the large-diameter pressurized chamber 70 and the reservoir 27 into communication with each other in the control cylinder 81. The valve chamber 133 and the chamber 35 are constantly in communication with each other through the hole perpendicular to shaft 123, the small-diameter shaft hole 122, and the large-diameter shaft hole 121 in the control piston 105. On the other hand, the control pressure chamber 134 is basically separated from the valve chamber 133 and the chamber 135. The control piston 105, in a valve-closing state where the valve seal 127 abuts against the valve seat 128, is subjected to the hydraulic pressure of the large-diameter pressurized chamber 70 in the valve-opening direction through the large-diameter pressurized chamber passage 90a. Each of the valve chamber 133 and the chamber 135, which is brought into communication with the reservoir 27, is basically at the atmospheric pressure. The amount of biasing force according to the hydraulic pressure of the primary hydraulic chamber 61 is exerted on the control piston 105 in the valve-opening direction due to a difference in pressure-receiving area between the seal ring 130 and the O-ring 131 which are subjected to the hydraulic pressure of the primary hydraulic chamber 61, which is introduced into the control pressure chamber 134.

As described above, the valve seat 128 for opening and closing the large-diameter pressurized chamber passage 90a, which is provided in the valve chamber 133 constantly in communication with the reservoir passage 92a, is provided in a communication path 137 for bringing the large-diameter pressurized chamber 70 and the reservoir 27 into communication with each other. More specifically, the valve seat 128 is provided between the large-diameter pressurized chamber passage 90a and the reservoir passage 92a. The valve seal 127 of the control piston 105, which is brought into contact with and is separated from the valve seat 128, opens and closes the large-diameter pressurized chamber passage 90a and the reservoir passage 92a.

The valve spring 106 constituted by a coil spring is located in the chamber 135 and in the large-diameter shaft hole 121 of the control piston 105. The valve spring 106 is interposed between a bottom surface of the large-diameter shaft hole 121 of the control piston 105 and the bottom portion 99 of the lid body 95. The valve spring 106 biases the control piston 105 in a direction in which the valve seal 127 comes into abutment against the valve seat 128, that is, a direction in which the communication path 127 is closed.

The valve spring 107 constituted by a coil spring is located on the outer side of the valve spring 106 in the chamber 135 so as to be concentric with the valve spring 106. The valve spring 107 is interposed between an end face of the fourth shaft portion 113 and the bottom portion 99 of the lid body 95 while the fifth shaft portion 114 of the control piston 105 is inserted to the inner side of the valve spring 107. The valve spring 107 also biases the control piston 105 in a direction in which the valve seal 127 comes into abutment against the valve seat 128, that is, a direction in which the communication path 137 is closed.

In the first embodiment, an annular flange portion 140 is formed at a position between the second shaft portion 111 and the third shaft portion 112 on an outer circumferential surface of the piston main body 115 of the control piston 105 so as to project in the radial direction. The flange portion 140 has a larger diameter than those of the third shaft portion 112 and the fourth shaft portion 113. The flange portion 140 abuts against the step portion 88 of the intermediate-diameter hole portion 85 on the small-diameter hole portion 84 side, which is formed on the inner circumferential surface of the control cylinder 81, to limit the further movement of the control piston 105 in the valve-closing direction. As a result, the amount of movement of the control piston 105 in the valve-closing direction is limited. Therefore, the flange portion 140 and the step portion 88 constitute a valve-closing direction restricting portion 141 which is provided between the control piston 105 and the control cylinder 81 to limit the amount of movement of the control piston 105 in the valve-closing direction so as to determine a movement limit position of the control piston 105 in the valve-closing direction. The flange portion 140 is brought into abutment against a step portion 143 formed on the inner circumferential surface of the control cylinder 81 by the end face of the lid body 95 to limit the further movement of the control piston 105 in the valve-opening direction. Specifically, the flange portion 140 and the step portion 143 constitute a valve-opening direction restricting portion 142 which is provided between the control piston 105 and the control cylinder 81 to limit the amount of movement of the control piston 105 in the valve-opening direction so as to determine a movement limit position of the control piston 105 in the valve-opening direction.

In the valve-closing direction restricting portion 141, while the valve seal 127 is brought into abutment against the valve seat 128 to achieve the valve-closed state by the biasing forces of the valve springs 106 and 107, the abutting portion (flange portion) 140 abuts against the step portion 88. At this time, a predetermined amount of gap L2 is generated between the distal end of the piston main body 115 and the valve seat 128. The gap L2 at this time is smaller than allowable stroke L1 of the control piston 105 in the valve-opening direction from this position, which is restricted by the valve-opening direction restricting portion 142. The valve-closing direction restricting portion 141 limits the amount of movement of the control piston 105 in the valve-closing direction so that an axial length of the valve seal 127, while abutting against the valve seat 128, has a predetermined amount, more specifically, becomes larger than an axial length of the valve seal 127 when the control piston 105 is pressed by the valve springs 106 and 107 without being restricted by the valve-closing direction restricting portion 141. Moreover, the valve-opening direction restricting portion 142 limits the amount of contraction of the valve springs 106 and 107 within a predetermined range.

The control pressure chamber 134 of the control valve 75 is constantly in communication with the primary hydraulic chamber 61 through the hydraulic chamber passage 93a. As a result, a thrust in a direction against the biasing force of the valve springs 106 and 107, that is, a thrust in the valve-opening direction, is generated by the hydraulic pressure of the primary hydraulic chamber 61 and the difference in pressure-receiving area between the seal ring 130 and the O-ring 131. Moreover, a thrust for biasing the control piston 105 in the valve-opening direction is generated by the hydraulic pressure in the large-diameter pressurized chamber 70 and a space surrounded by the projection 125 of the valve seal 127 and the valve seat 128 against which the projection 125 abuts. When the control piston 105 is moved by the resultant force of the aforementioned thrusts against the biasing forces of the valve springs 106 and 107; the communication path 137 is opened to allow the hydraulic pressure in the large-diameter pressurized chamber 70 to escape to the reservoir 27 through the communication path 137. At this time, the thrust generated for the control piston 105 increases according to an increase in hydraulic pressure in the primary hydraulic chamber 61, which is introduced into the control pressure chamber 134. As a result, the control piston 105 allows the hydraulic pressure in the large-diameter pressurized chamber 70 to escape to the reservoir 27 so that the hydraulic pressure in the large-diameter pressurized chamber 70 is gradually reduced according to the increase in hydraulic pressure in the primary hydraulic chamber 61.

Specifically, at the time of fast fill described above, the seal ring 41 illustrated in FIG. 4 is forcibly opened to deliver the brake fluid from the large-diameter pressurized chamber 70 to the primary hydraulic chamber 61 to compensate for the ineffective fluid amount (mainly, the amount of caliper rollback) during the initial stage of the stroke. Thereafter, for compensating for an insufficient amount of brake fluid, which is generated with the reduction in diameter of the primary hydraulic chamber 61, the hydraulic pressure in the large-diameter pressurized chamber 70 and the hydraulic pressure in the primary hydraulic chamber 61 are increased to a pressurized chamber relief hydraulic pressure while being held at the same hydraulic pressure with the brake fluid being delivered from the large-diameter pressurized chamber 70 to the primary hydraulic chamber 61. When the hydraulic pressure in the large-diameter pressurized chamber 70 and the hydraulic pressure in the primary hydraulic chamber 61 are increased to reach the pressurized chamber relief hydraulic pressure, the control valve 75, which is in the closed state until then, releases the hydraulic pressure in the large-diameter pressurized chamber 70. At this time, the control valve 75 allows the hydraulic pressure in the large-diameter pressurized chamber 70 to escape to the reservoir 27 so that the hydraulic pressure in the large-diameter pressurized chamber 70 is gradually reduced according to the increase in hydraulic pressure in the primary hydraulic chamber 61 as described above. Although the master cylinder 10 has been described as the plunger-type master cylinder in the first embodiment, a conventional type or center valve-type master cylinder can be appropriately used as long as the fast fill can be performed.

(Required Performance of the Master Cylinder)

Although varied depending on countries and regions, the brake systems have various legal regulations concerning safety performance. There are Federal Motor Vehicle Safety Standards (FMVSS) as an example of the legal regulations. The FMVSS define that, in case of failure of the booster, a stopping distance is 73 meters (240 feet) or shorter at a speed of 100 kilometers per hour with the pressing amount on the brake pedal being 65 N or larger and 500 N or smaller. For realizing the stopping distance described above, a deceleration rate of about 2.5 m/s$^2$ is required to be achieved (hereinafter, referred to as "required performance") based on the calculation. Therefore, for designing the brake system for a specific type of vehicle, the specifications such as a cylinder diameter of the master cylinder 10, the boost ratio of the booster BS, the cylinder diameter of each of the wheel cylinders A14 and A15, and a friction material are determined so as to achieve the required performance. Therefore, the brake system is designed in consideration of vehicle performance so as to achieve the required performance described above. Therefore, in the vehicle which is designed so as to achieve the required performance described above, the hydraulic pressure generated in the master cylinder 10 is determined uniquely when the pressing force of 500 N is applied to the brake pedal in case of failure of the booster BS.

In the conventional fast-fill type master cylinder including the large-diameter pressurized chamber and the small-diameter pressure chamber, the setting is performed so that the master cylinder hydraulic pressure is generated in the small-diameter pressure chamber whenever the pressing force of 500 N is applied to the brake pedal in case of failure of the booster for the following two reasons. The first reason is that the master cylinder is to compensate for the ineffective fluid amount during the initial stage of the stroke so as to shorten the pedal stroke in the initial stage. The second reason is that an insufficient hydraulic pressure due to the absence of the assist force of the booster (the force is generally boosted up to about 6 to 10 times by the booster) in case of failure of the booster, and therefore, a higher hydraulic pressure can be generated in the small-diameter pressure chamber as compared with that generated in the large-diameter pressurized chamber when the same pressing force is applied. Specifically, a valve-opening pressure of the pressure-reducing valve is set within a low hydraulic-pressure region (although varied depending on the vehicle specifications, the valve is opened at approximately 0.8 MPa and the atmospheric pressure is achieved at about 1.6 Mpa, in an example). As a result, even in case of failure of the booster, when the pressing force applied to the brake pedal is 500 N, the high hydraulic pressure is generated not in the large-diameter pressurized chamber but in the small-diameter pressure chamber so as to achieve the aforementioned required performance.

In view of the achievement of the required performance described above, the pressing force applied to the brake pedal can be set equal to or smaller than 500 N as long as the pressing force is 65 N or larger. In view of the compensation for the insufficient hydraulic pressure in case of failure of the booster, however, the required performance is more easily achieved with the larger pressing force. Therefore, the pressing force is set to 500 N as a reference value.

In contrast with the related art, according to the present invention, the failure of the booster is detected by the detection means using the negative-pressure sensor 4 or the like, and the pump-up means (pressure-intensifying means) of the brake control unit BU is used to perform the brake assist control. As a result, the hydraulic pressure which enables the required performance to be achieved can be supplied to the wheel cylinders A14 and A15. Therefore, according to the present invention, the valve-opening hydraulic pressure of the control valve 75 functioning as the pressure-reducing valve can be set to a hydraulic pressure as high as about 4 MPa as a preferred example.

The hydraulic pressure of 4 MPa is higher than the hydraulic pressure obtained when the pressing force applied to the brake pedal BP is 500 N or the hydraulic pressure which enables the deceleration rate of 2.5 m/s$^2$ (set to about 2.3 MPa as an average although varied depending on the vehicle specifications, and the range of hydraulic pressure is set to about 1.7 MPa to 2.9 MPa according to the empirical rule), in case of failure of the booster BS. In terms of the deceleration rate generated in the vehicle when the booster BS operates normally, it corresponds to the hydraulic pressure for obtaining the deceleration rate of about 4 m/s$^2$ as an average and the range of deceleration rate of about 3.2 to 5.3 m/s$^2$ according to the empirical rule. Although varied depending on the vehicle specifications, a good brake pedal feel is obtained when the control valve 75 is set so as to be opened at the hydraulic pressure for obtaining the deceleration rate of about 4 m/s$^2$ (about 3.2 to 5.3 m/s$^2$) when the booster BS operates normally. The brake pedal feel is represented mainly by the relation between the pressing force, the amount of stroke, and the deceleration rate, which are described below.

(Operation Characteristics of the Master Cylinder)

Figure 6:
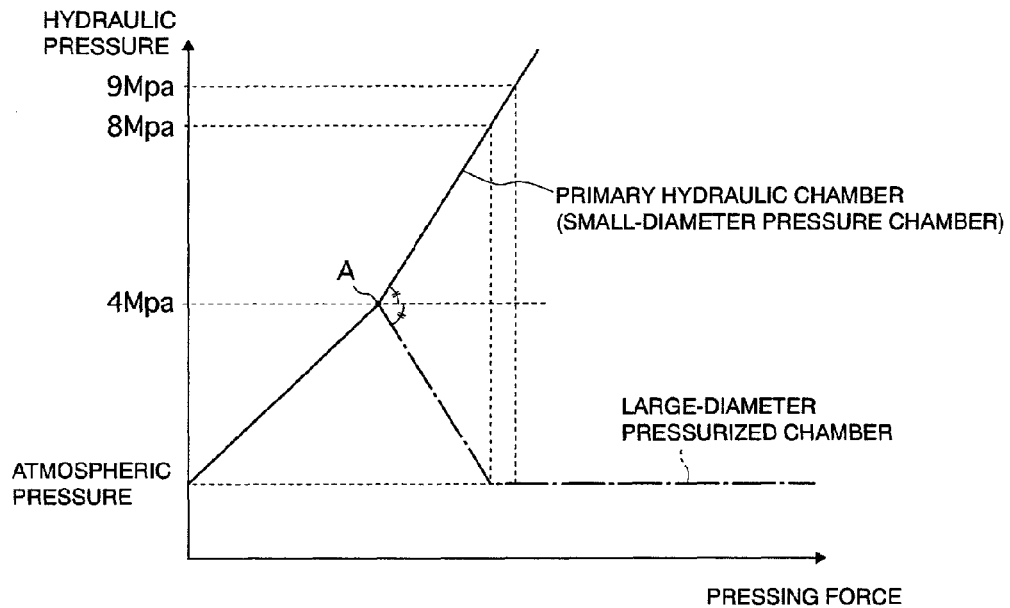
FIG. 6 is a graph showing a relation between a hydraulic pressure in a primary hydraulic chamber and a hydraulic pressure in a large-diameter pressurized chamber with respect to a pressing force on a brake pedal, which is input to the brake pedal.

FIG. 6 is a graph showing the relation between the hydraulic pressure in the primary hydraulic chamber (small-diameter pressure chamber) 61 and the hydraulic pressure in the large-diameter pressurized chamber 70 with respect to the pressing force on the brake pedal, which is input to the brake pedal BP. In the first embodiment, when the brake pedal BP is pressed down to increase both the hydraulic pressure in the primary hydraulic chamber 61 and the hydraulic pressure in the large-diameter pressurized chamber to 4 MPa, the force for pressing down the piston main body 115 of the control valve 75 against the biasing forces of the valve springs 106 and 107 becomes larger than a set load of the valve springs 106 and 107. Then, the valve seal 127 is opened to allow the brake fluid in the large-diameter pressurized chamber 70 to flow into the valve chamber 133 of the control valve 75 through the pressurized chamber communication hole 90.

The brake fluid flowing into the valve chamber 133 is returned back through the reservoir passage 92a in communication with the small-diameter hole portion 84 from the reservoir communication hole 92 to the reservoir 27. When the piston main body 115 makes a stroke, the chamber 135 and the valve chamber 133 are constantly in communication with each other through the large-diameter shaft hole 121, the small-diameter shaft hole 122, and the hole perpendicular to shaft 123 (hereinafter, collectively referred to as "a communication path"). Therefore, the stroke of the piston main body 115 is not inhibited at all. At this time, a flow path resistance of the communication path may be appropriately adjusted to set stroke characteristics of the piston main body 115 or the like, and a method of setting the stroke characteristics of the piston main body 115 is not particularly limited.

When the driver further presses down the brake pedal BP so that the hydraulic pressure in the primary hydraulic chamber 61 exceeds 4 MPa, the control valve 75 is opened to reduce the hydraulic pressure in the large-diameter pressurized chamber 70 and the primary hydraulic chamber 61 contributes to an increase in the master cylinder hydraulic pressure. Therefore, as illustrated in FIG. 6, a rate of increase in hydraulic pressure (hydraulic pressure rise gradient) with respect to the increase in pressing force becomes large. Thus, the hydraulic pressure in the large-diameter pressurized chamber 70 is gradually reduced from 4 MPa. At this time, an absolute value of a hydraulic pressure drop gradient corresponding to a rate of reduction in hydraulic pressure in the large-diameter pressurized chamber 70 with respect to the increase in pressing force is substantially the same as that of the hydraulic pressure rise gradient of the primary hydraulic chamber 61.

It is preferred that, as shown in FIG. 6, the hydraulic pressure in the large-diameter pressurized chamber 70 be reduced to the atmospheric pressure before the hydraulic pressure in the primary hydraulic chamber 61 reaches 9 MPa. The reason is as follows. In the first embodiment, the hydraulic pressure when booster BS reaches the full-load point is set around 10 MPa. When the hydraulic pressure is 9 MPa which is lower than the hydraulic pressure when the booster BS reaches the full-load point, the hydraulic pressure in the large-diameter pressurized chamber 70 has become equal to the atmospheric pressure. Therefore, the high hydraulic pressure can be generated by the primary hydraulic chamber 61 even after the booster BS reaches the full-load point at which the assist force is no longer obtained. The control valve 75 is set so that, on the graph indicating the hydraulic pressure in the primary hydraulic chamber 61 on an abscissa axis and the hydraulic pressure in the large-diameter pressurized chamber 70 on an ordinate axis, the hydraulic pressure rise gradient of the primary hydraulic chamber 61 and the hydraulic pressure drop gradient of the large-diameter pressurized chamber 70 have substantially a one-to-one relation after the control valve 75 is opened, as a preferred embodiment. With such setting, the generation of the hydraulic pressure can be smoothly switched from the large-diameter pressurized chamber 70 to the primary pressure chamber 61 without interruption. Therefore, the hydraulic pressure in the primary hydraulic chamber 61 and the hydraulic pressure in the large-diameter pressurized chamber 70 have such a relation that the hydraulic pressure in the large-diameter pressurized chamber 70 is reduced from 4 MPa to the atmospheric pressure whereas the hydraulic pressure in the primary hydraulic chamber 61 is increased from 4 MPa to about 8 MPa.

(Control in Case of Failure of the Booster)

Figure 7:
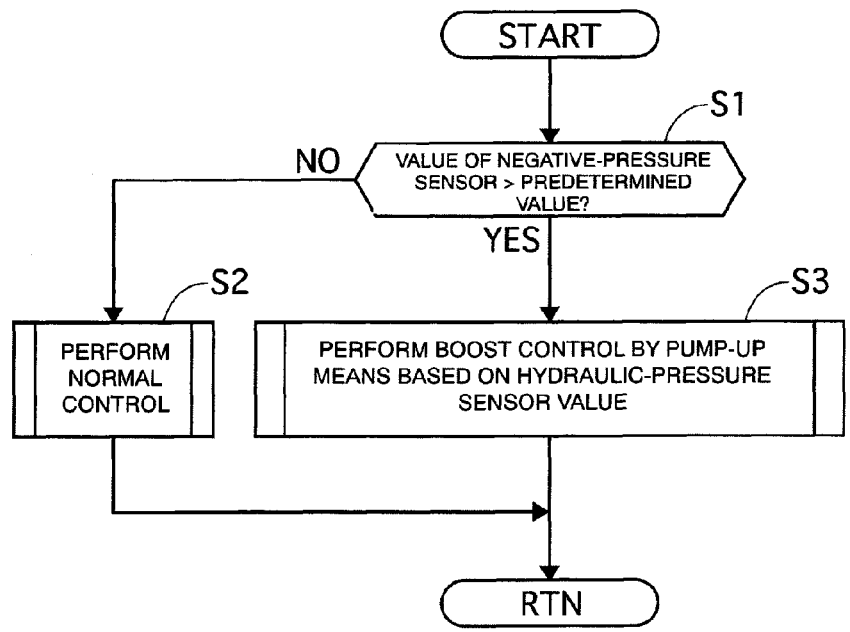
FIG. 7 is a flowchart illustrating control processing in case of failure of the booster, which is executed in a control unit ECU according to the first embodiment.

FIG. 7 is a flowchart showing control processing in case of failure of the booster, which is performed in the control unit ECU.

In Step S1, it is determined whether or not the negative pressure detected by the negative-pressure sensor a4 is larger than a predetermined value. When it is determined that the detected negative pressure is equal to or smaller than the predetermined value, it is determined that a sufficient negative pressure is ensured and the processing proceeds to Step S2. On the other hand, when it is determined that the detected negative pressure is larger than the predetermined value, it is determined that the negative pressure is insufficient and the processing proceeds to Step S3. This Step S1 corresponds to the detection means for detecting the failure of the booster. It should be noted that, in the present invention, an expression "a negative pressure is large" means that a pressure value is a value closer to the atmospheric pressure side.

In Step S2, normal control using the booster BS is appropriately executed. The normal control in the first embodiment indicates the entire control or a part of control, which functions when the booster BS operates normally, can be executed or is being executed.

In Step S3, the booster BS has failed, and hence the brake assist control with the pump-up means is performed in place of the boost functions obtained with the booster BS.

(Correspondence Relation between the Control when the Booster Operates Normally and the Control in Case of Failure of the Booster)

Figure 8:
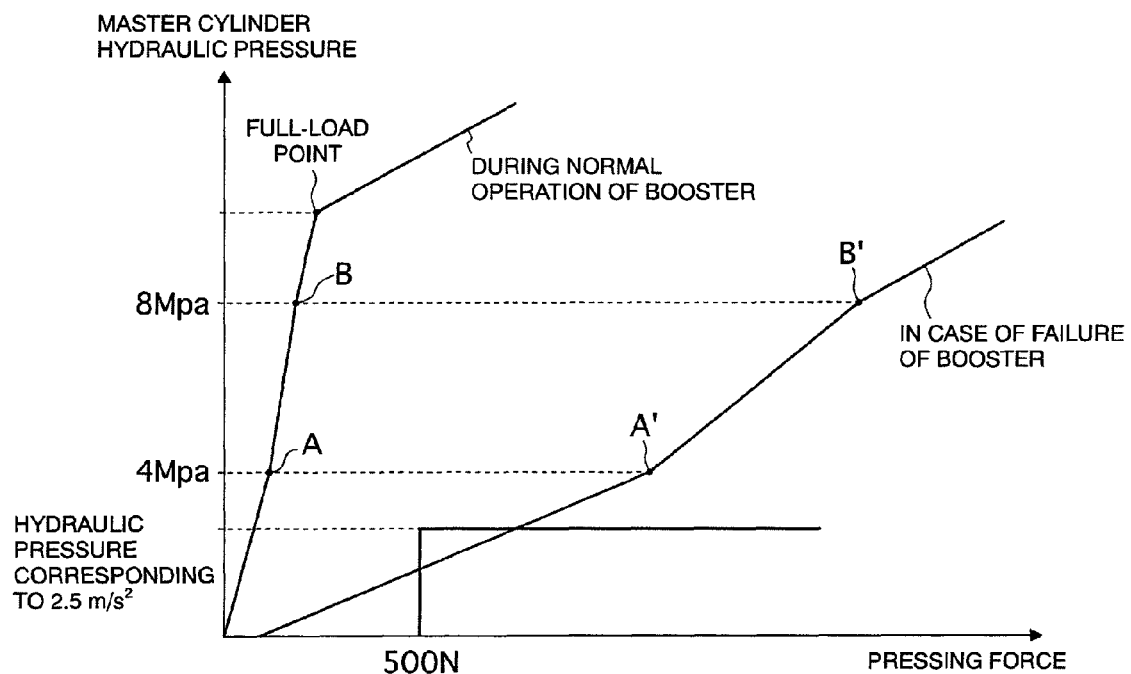
FIG. 8 is a graph showing a relation of a master cylinder hydraulic pressure with respect to the pressing force.
Figure 9:
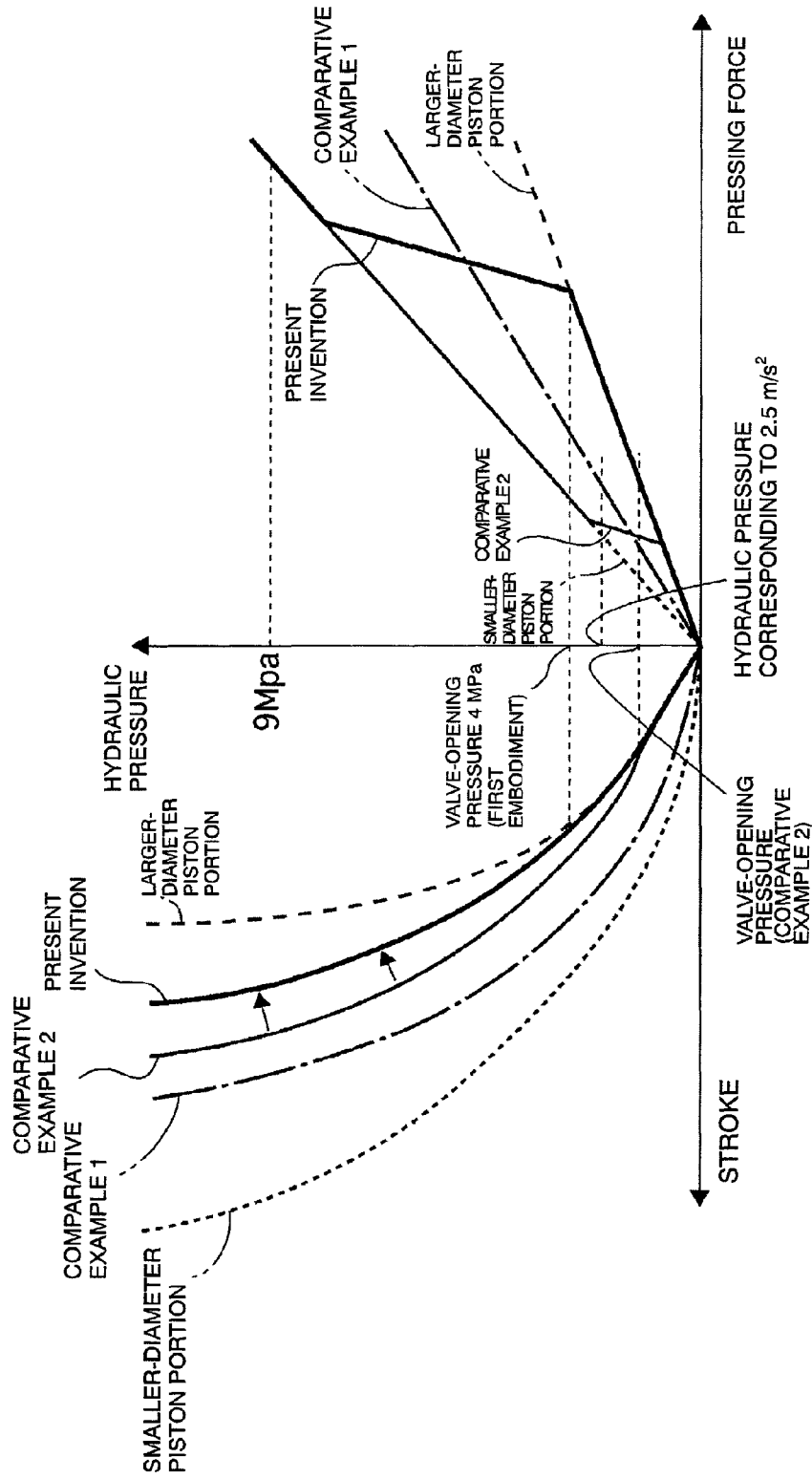
FIG. 9 is a characteristic view showing a relation between a stroke of the brake pedal and the hydraulic pressure and a relation between the pressing force without an assist force and the hydraulic pressure.

Next, the functions in the control in case of failure of the booster are described referring to FIGS. 8 and 9. FIG. 8 is a graph showing the relation of the master cylinder hydraulic pressure with respect to the pressing force. The pressing force shown in FIG. 8 is a pressing force obtained by a muscle force of the driver, in other words, a force applied from the brake pedal BP to the input shaft B34. That is, the pressing force differs from the force applied from the output shaft B46 to the master cylinder 10 after being assisted by the booster BS.

[Relation between the Pressing Force (Muscle Force) and the Master Cylinder Hydraulic Pressure when the Booster Operates Normally]

When the booster BS operates normally, the assist force is generated by the booster BS upon generation of the pressing force of the driver on the brake pedal. As a result, the driver can obtain the master cylinder hydraulic pressure of 4 MPa with a short pedal stroke (at a point A shown in FIG. 8). When the master cylinder hydraulic pressure exceeds 4 MPa, the hydraulic pressure in the large-diameter pressurized chamber 70 is gradually reduced to the atmospheric pressure by the control valve 75 while an area of the piston which compresses the primary hydraulic chamber 61 starts changing so as to be equal to an area corresponding effective pressure-receiving area of the small-diameter piston portion 65. Therefore, a steep hydraulic pressure rise gradient can be obtained. Specifically, although the pedal stroke is lengthened, the high master cylinder hydraulic pressure can be obtained with a relatively small increase in pressing force. Then, when the hydraulic pressure in the large-diameter pressurized chamber 70 becomes completely equal to the atmospheric pressure, the master cylinder hydraulic pressure is generated by the small-diameter piston portion 65 alone (at a point B shown in FIG. 8). When the boost ratio is changed in the booster BS, for example, as in the case of the electric booster, the actual hydraulic pressure characteristics are affected by the change in boost ratio. However, the detailed description thereof is herein omitted.

Thereafter, when the pressing force further increases, a difference in pressure between the constant-pressure chambers B18 and B19 and the variable-pressure chambers B20 and B21 of the booster BS gradually becomes smaller. Then, the booster BS reaches the full-load point (for example, 10 MPa), at which the assist force is no longer obtained because of the absence of the difference in pressure between the constant-pressure chambers B18 and B19 and the variable-pressure chambers B20 and B21. Subsequently, the increase in pressing force directly contributes to the increase in master cylinder hydraulic pressure without any assist force. Specifically, the hydraulic pressure rise gradient becomes smaller as compared with that obtained with the assist force generated by the booster BS.

[Relation Between the Pressing Force (Muscle Force) and the Master Cylinder Hydraulic Pressure in Case of Failure of the Booster]

On the other hand, if the booster BS fails, the assist force is not applied to the pressing force. Therefore, the master cylinder hydraulic pressure obtained by dividing the pressing force by an effective pressure-receiving area of the large-diameter piston portion 66 is generated during the initial stage of the stroke, during which the pressing of the brake pedal BP is started. The hydraulic pressure rise gradient at this time is considerably smaller than the hydraulic pressure rise gradient obtained with the assist force generated by the booster BS.

When the pressing force reaches 500 N, there is generated only the master cylinder hydraulic pressure lower than the hydraulic pressure which enables the vehicle deceleration rate of 2.5 m/s$^2$ (for example, 2.3 MPa; hereinafter, referred to as "a hydraulic pressure corresponding to 2.5 m/s$^2$") to be obtained. The reason is as follows. The control valve 75 remains closed because the valve-opening pressure for the control valve 75 is set within the high hydraulic-pressure range, that is, to 4 MPa in the first embodiment. Therefore, the hydraulic pressure is generated by the large-diameter pressurized chamber 70. However, the insufficient amount of hydraulic pressure can be compensated for by performing the brake assist control with the pump-up means. The amount of hydraulic pressure to be compensated for by the brake assist control with the pump-up means depends on the required performance of the vehicle and can be appropriately set as long as the hydraulic pressure corresponding to 2.5 m/s$^2$ is generated with the pressing force of 500 N.

When the pressing force further increases, the hydraulic pressure reaches 4 MPa which is higher than the hydraulic pressure corresponding to 2.5 m/s$^2$. Then, the control valve 75 is opened to reduce the hydraulic pressure in the large-diameter pressurized chamber 70 (at a point A' shown in FIG. 8). Then, when the hydraulic pressure in the large-diameter pressurized chamber 70 becomes completely equal to the atmospheric pressure by the control valve 75, the master cylinder hydraulic pressure is generated by the small-diameter piston portion 65 alone (at a point B' shown in FIG. 8).

(Required Performance of the Master Cylinder in Case of Failure of the Booster)

If the booster BS fails, the assist force is no longer provided. Therefore, a minimum vehicle braking force is required to be obtained even when the braking is performed only with the muscle force of the driver. The hydraulic pressure is obtained by dividing the exerted force by the effective pressure-receiving area, and hence the required pressure can be ensured if the effective pressure-receiving area of the piston of the master cylinder is set small.

(Feeling Performance Required for the Master Cylinder)

On the other hand, the brake is required to have feeling performance determined by the relation between the pressing force, the stroke, and the generated deceleration rate. If the deceleration rate is hardly generated even though the driver starts pressing down the brake pedal BP to apply the pressing force and generate the stroke; the driver cannot obtain a good pedal-press response. Such a low pedal-press response is expressed as a low rigid impression of the brake. When the rigid impression of the brake is too low, the brake pedal feel is evaluated as bad. One of the main factors of lowered rigid impression is the consumption of the brake fluid. The brake fluid is consumed for reducing a rotational play to eliminate a gap between a brake pad and a brake rotor when the brake fluid is supplied to the wheel cylinders. On the other hand, if a desired deceleration rate is generated with a shortened stroke when the pressing force is applied, the driver can obtain a good pedal-press response. Such a satisfactory pedal-press response is represented as high rigid impression of the brake, and a brake pedal feel in such a case is generally evaluated as being good.

(Relation Between the Stroke and the Feeling Performance)

Specifically, for the operation of the brake pedal, the deceleration rate is required to be generated along with a proper degree of stroke generated by the generation of the pressing force. On the other hand, because a feel with respect to the stroke is not particularly required to be taken into consideration as the required performance in case of failure of the booster, the minimum performance can be ensured by merely reducing the effective pressure-receiving area of the piston of the master cylinder as described above. When the booster normally operates, however, a long stroke is required to be generated if the effective pressure-receiving area is small. As a result, the rigid impression is low to degrade the feel. Specifically, the larger effective pressure-receiving area is preferred in order to improve the rigid impression on the condition that the assist force is obtained.

The assist force is not obtained not only in case of failure of the booster BS but also when the booster BS operates after reaching the full-load point. Therefore, the smaller pressure-receiving area is preferred to ensure the sufficient braking force. Therefore, in order to improve the rigid impression and to ensure the sufficient braking force at the same time, the amount of brake fluid required for reducing the rotational play is supplied in the large-diameter pressurized chamber 70 in the master cylinder according to the first embodiment when the booster BS operates normally. In addition, the hydraulic pressure in the higher hydraulic-pressure range (up to 4 MPa) is generated by the large-diameter pressurized chamber 70. In this manner, a good brake pedal feel is obtained in the master cylinder according to the first embodiment. Moreover, in case of failure of the booster BS, the hydraulic pressure is generated by the large-diameter pressurized chamber 70. When the pressing force reaches 500 N, the hydraulic pressure generated only by the master cylinder is insufficient. However, the insufficient amount of hydraulic pressure can be compensated for by performing the brake assist control with the pump-up means. Then, because the assist force is no longer provided even if the booster BS operates normally when the booster BS operates after reaching the full-load point; the control valve 75 is opened before the booster BS reaches the full-load point. In this manner, the generation of the hydraulic pressure is switched from the large-diameter pressurized chamber 70 to the primary hydraulic chamber (small-diameter pressure chamber) 61 to generate a larger braking force.

FIG. 9 is a characteristic view showing the relation between the stroke of the brake pedal and the hydraulic pressure supplied to the wheel cylinder and the relation between the pressing force without the assist force and the hydraulic pressure. In FIG. 9, Comparative Example 1 shows the case where the effective pressure-receiving area of the piston of the master cylinder is fixed (the effective pressure-receiving area of the piston is an area intermediate between the effective pressure-receiving area of the large-diameter piston portion 66 in the large-diameter pressurized chamber 70 and that of the small-diameter piston portion 65 in the primary hydraulic chamber 61). Comparative Example 2 shows the case where the switching of the effective pressure-receiving area as in the first embodiment of the present invention is possible and the valve-opening pressure is set lower than that of the first embodiment.

A gradient of a characteristic indicated with a straight line shown on the right side of FIG. 9 corresponds to an inverse of the effective pressure-receiving area. When the effective pressure-receiving area is small, the gradient becomes steeper. The stroke characteristics shown on the left side of FIG. 9 show that, with a smaller pressure-receiving area, a longer stroke is required to obtain the same hydraulic pressure.

Because the stroke is required to be shortened to improve the rigid impression, the effective pressure-receiving area is required to be increased. Because the switching of the effective pressure-receiving area is not possible in Comparative Example 1, a gradient which allows the hydraulic pressure corresponding to 2.5 m/s$^2$ with the pressing force of 500 N to be obtained is a minimum gradient. The further shortening of the stroke is not possible.

Next, in Comparative Example 2, because the large-diameter pressurized chamber 70 acts in the area with the small pressing force, the stroke can be reduced to improve the rigid impression. However, because the valve-opening pressure is set low in order to obtain the hydraulic pressure corresponding to 2.5 m/s$^2$ with the pressing force of 500 N, the shortening of the stroke is limited in the region where the pressing force is small (in the low hydraulic-pressure region). In the region where the pressing force is large, the stroke cannot be shortened.

Characteristics of the First Embodiment

As Comparative Examples 1 and 2 described above show, the degree of shortening of the stroke is limited if the required performance in case of failure of the booster is desired to be achieved at the same time. However, the required performance in case of failure of the booster does not define the diameter of the master cylinder but define so that the deceleration rate of 2.5 m/s$^2$ is obtained with the pressing force of 500 N. Therefore, in the first embodiment, the required performance in case of failure of the booster is achieved not by the master cylinder but different means. On the master cylinder side, the valve-opening pressure is set so as to obtain optimal characteristics as a feel when the booster operates normally.

More specifically, a reference diameter in the case where the effective pressure-receiving area of Comparative Example 1 is set as a reference area and a shape thereof is circular is defined. In the master cylinder of the first embodiment, the large-diameter piston portion 66 is set larger than the reference diameter by ⅛ to ¼ inch and the small-diameter piston portion 65 is smaller than the reference diameter by 1/16 to ⅛ inch. Moreover, by setting the valve-opening pressure to 4 MPa, the effective pressure-receiving area of the large-diameter piston portion 66 acts even in a normal use region. Here, "the normal use region" is a region of the hydraulic pressure used in a general driving state without sudden braking, for driving in an urban area when the booster BS operates normally, that is, a region in which a rate of the number of times of pressing the brake pedal at the hydraulic pressure equal to or lower than 4 MPa to a total number of times of pressing the brake pedal is remarkably high.

As described above, the effective pressure-receiving area of the large-diameter piston portion can be used in the normal use region. Moreover, because the pedal stroke can be remarkably shortened, a good pedal feel can be obtained. More specifically, the pedal stroke can be shortened by about 10% as compared with the case where the existing master cylinder which achieves the required performance in case of failure of the booster. In addition, because the effective pressure-receiving area of the large-diameter piston portion is used in the normal use region, a good pedal-press response with a high rigid impression can be obtained while ensuring the sufficient braking force.

On the other hand, the effective pressure-receiving area of the small-diameter piston portion can be set smaller than that of the existing master cylinder of Comparative Example 1, which achieves the required performance in case of failure of the booster. As a result, the hydraulic pressure generated when the booster reaches the full-load point can be set higher than that with the existing master cylinder which achieves the required performance in case of failure of the booster. Therefore, the braking distance can be reduced. Moreover, in the region where the deceleration rate is required after the valve-opening pressure, a build-up feel of the deceleration rate can be improved to obtain a good braking feel.

When the booster BS operates normally, it is conceivable to compensate for the hydraulic pressure, which is obtained when the booster reaches the full-load point, by the pressure-intensifying means, in the case where each of the effective pressure-receiving areas in the primary hydraulic chamber and the secondary hydraulic chamber is set to the effective pressure-receiving area which allows the achievement of the required performance in case of failure of the booster. According to such a method, however, it is necessary to detect both the hydraulic pressure and the pressing force to confirm that the booster has reached the full-load point. Therefore, a pressing-force sensor is additionally required. The pressing-force sensor herein is a sensor for detecting not an axial force of the output shaft B46, which is correlated with the master cylinder hydraulic pressure, but an axial force of the input shaft B34, and is therefore expensive as a sensor. Moreover, because pressure-intensification control is required to be frequently performed at the time of normal braking, a load on the pressure-intensifying means is increased to lower durability. In addition, a control logic is additionally required. Thus, it is extremely difficult to realize the aforementioned method.

As described above, the functions and effects listed below can be obtained in the first embodiment.

(1) There are provided: the master cylinder 10 including the primary hydraulic chamber (small-diameter pressure chamber) 61 and the large-diameter pressurized chamber 70 which are formed by the primary piston (stepped piston) 18 inserted into the cylinder body (stepped cylinder) 15, the movement of the primary piston 18 causing the hydraulic pressure to be supplied from the large-diameter pressurized chamber 70 to the primary hydraulic chamber 61 and generating the hydraulic pressure in the primary hydraulic chamber 61, the generated hydraulic pressure being supplied to the wheel cylinders A14 and A15, the master cylinder further including the control valve (pressure-reducing valve) 75 being opened at the predetermined valve-opening hydraulic pressure by the hydraulic pressure in the primary hydraulic chamber 61 and the hydraulic pressure in the large-diameter pressurized chamber 70 to bring the large-diameter pressurized chamber 70 into communication with the reservoir 27 to gradually reduce the hydraulic pressure in the large-diameter pressurized chamber 70 along with the increase in the hydraulic pressure in the primary hydraulic chamber 61; the booster BS for assisting the input from the brake pedal BP to move the primary piston 18, the booster BS having the full-load point at which the assist force is no longer generated; Step S1 shown in FIG. 7, which corresponds to the detection means for detecting the failure of the booster BS; and the pump-up means corresponding to the pressure-intensifying means for compensating for the hydraulic pressure to be supplied to the wheel cylinders A14, A15 with the hydraulic pressure generated by the pumps A12 corresponding to the hydraulic pressure source different from the master cylinder 10 when the failure of the booster BS is detected by the detection means. The valve-opening pressure for the control valve 75 is set so that the control valve 75 is opened when the hydraulic pressure in the primary hydraulic chamber 61 is higher than any one of the hydraulic pressure with the pressing force applied to the brake pedal BP being 500 N and the hydraulic pressure which allows the design deceleration rate of 2.5 m/s$^2$ to be obtained based on the vehicle specifications (hydraulic pressure corresponding to 2.5 m/s$^2$) and is lower than the hydraulic pressure obtained when the booster BS reaches the full-load point.

In other words, the valve-opening pressure for the control valve 75 is set so that the control valve 75 is opened when the hydraulic pressure in the primary hydraulic chamber 61 is higher than 3 MPa (hydraulic pressure higher than the hydraulic pressure corresponding to 2.5 m/s$^2$) and lower than 10 MPa (hydraulic pressure when the booster reaches the full-load point), for example, when the hydraulic pressure in the primary hydraulic chamber 61 is 4 MPa, thereby reducing the hydraulic pressure in the large-diameter pressurized chamber 70 to the atmospheric pressure with the increase in hydraulic pressure after the control valve 75 is opened. The valve-opening pressure is not limited to 4 MPa; the valve-opening pressure may also be set to 3 MPa as long as the valve-opening pressure is higher than the hydraulic pressure corresponding to 2.5 m/s$^2$. Even if the valve-opening pressure is set to 5 MPa, the hydraulic pressure in the large-diameter pressurized chamber 70 becomes equal to the hydraulic pressure in the reservoir or the atmospheric pressure (including the pressures approximately the same thereto) around 10 MPa which corresponds to the hydraulic pressure obtained when the booster BS reaches the full-load point. Therefore, various set pressures can be selected. Moreover, the valve-opening pressure for the control valve 75 is determined based on the valve-opening characteristics of the control valve 75, and is preferably set so that the hydraulic pressure in the large-diameter pressurized chamber 70 becomes equal to the hydraulic pressure in the reservoir or the atmospheric pressure before the hydraulic pressure in the primary hydraulic chamber 61 becomes the hydraulic pressure obtained when the booster reaches the full-load point. Thus, in a structure in which the valve-opening pressure of the control valve 75 is set by the hydraulic pressure in the primary hydraulic chamber 61 alone, the control valve 75 is placed in the valve-open state when the hydraulic pressure in the primary hydraulic chamber 61 exceeds the valve-opening pressure. As a result, the hydraulic pressure in the large-diameter pressurized chamber 70 rapidly becomes equal to the hydraulic pressure in the reservoir or the atmospheric pressure. In this case, the valve-opening pressure can also be set to, for example, 8 or 9 MPa. Further, the control valve 75 increases the difference in pressure-receiving area between the seal ring 130 and the O-ring 131 while reducing the pressure-receiving area of the projection 125 of the valve seal 127, which forms the space with the valve seat 128, thereby adjusting the pressure gradient from the opening of the control valve 75 to the point at which the hydraulic pressure in the large-diameter pressurized chamber 70 becomes equal to the atmospheric pressure. For example, if the hydraulic pressure rise gradient of the primary hydraulic chamber 61 and the hydraulic pressure drop gradient of the large-diameter pressurized chamber 70 are set to have a 1:2 relation after the control valve 75 is opened, the control valve 75 may be set to be opened at 5 MPa (or 6 MPa), whereas the hydraulic pressure in the primary hydraulic chamber at which the hydraulic pressure in the large-diameter pressurized chamber 70 becomes equal to the atmospheric pressure may be set to 7.5 MPa (or 9 MPa).

Thus, for normal braking, the hydraulic pressure does not become insufficient around the time the full-load point of the booster BS to generate the desired braking force. In addition, since the region where the hydraulic pressure is generated by the large-diameter pressurized chamber 70 is enlarged, the pedal stroke for the braking force can be shortened. Accordingly, a good pedal feel with a high rigid impression can be provided.

(2) The control valve 75 is set to be opened when the hydraulic pressure in the primary hydraulic chamber 61 is equal to or higher than the hydraulic pressure which allows the deceleration rate of, for example, 3.2 to 5.3 m/s$^2$ to be obtained in the case where the booster BS operates normally. In other words, the control valve 75 is opened when the hydraulic pressure in the primary hydraulic chamber 61 becomes equal to 4 MPa or higher. Thus, the braking with the hydraulic pressure generated by the large-diameter pressurized chamber 70 can be ensured in the normal braking region. Further, the pedal stroke in the normal braking region is reduced to obtain a good pedal feel.

(3) The control valve 75 may be set so that the hydraulic pressure in the large-diameter pressurized chamber becomes equal to the hydraulic pressure in the reservoir (or the atmospheric pressure) when the hydraulic pressure in the primary hydraulic chamber 61 is around the hydraulic pressure obtained when the booster BS reaches the full-load point. Specifically, it is desirable to set the control valve 75 so that the hydraulic pressure in the large-diameter pressurized chamber 70 becomes equal to the hydraulic pressure in the reservoir or the atmospheric pressure before the hydraulic pressure in the primary hydraulic chamber 61 becomes equal to the hydraulic pressure obtained when the booster reaches the full-load point. However, the hydraulic pressure in the large-diameter pressurized chamber 70 may become equal to the hydraulic pressure in the reservoir after the hydraulic pressure in the primary hydraulic chamber 61 reaches the hydraulic pressure obtained when the booster reaches the full-load point. In this case, if the control valve 75 is opened before the hydraulic pressure in the primary hydraulic chamber 61 reaches the hydraulic pressure obtained when the booster reaches the full-load point, the hydraulic pressure in the large-diameter pressurized chamber 70 is lowered as compared with that obtained when the control valve 75 is opened. Therefore, a correspondingly higher degree of hydraulic pressure is expected to be generated by the primary hydraulic chamber 61 even without the assist force of the booster BS when the booster reaches the full-load point.

By the setting as described above, a loss in pressing force due to the hydraulic pressure generated in the large-diameter pressurized chamber after the booster BS reaches the full-load point can be reduced. Therefore, the pressing force of the driver can be efficiently turned into the braking force.

(4) The control valve 75 is set so that the hydraulic pressure in the large-diameter pressured chamber 70 becomes equal to the hydraulic pressure of the reservoir 27 before the hydraulic pressure in the primary hydraulic chamber 61 becomes equal to the hydraulic pressure obtained when the booster BS reaches the full-load point. More specifically, in the case where the hydraulic pressure obtained when the booster reaches the full-load point is 10 MPa, the control valve 75 is set so that the hydraulic pressure in the large-diameter pressurized chamber 70 becomes equal to the atmospheric pressure before the hydraulic pressure in the primary hydraulic chamber 61 becomes equal to 9 MPa which is lower than the hydraulic pressure obtained when the booster BS reaches the full-load point, i.e., 10 MPa. Therefore, a good pedal feel can be obtained. Because the hydraulic pressure obtained when the booster BS reaches the full-load point is determined based on the vehicle specifications, the hydraulic pressure obtained when the booster reaches the full-load point is not limited to 10 MPa and may be larger or smaller than 10 MPa. If the hydraulic pressure obtained when the booster reaches the full-load point is smaller than 10 MPa, for example, is 8 MPa, the valve-opening pressure for the control valve 75 may be suitably set smaller than 8 MPa.

(5) The control valve 75 is set to be opened when the hydraulic pressure in the primary hydraulic chamber 61 becomes higher than 3 MPa. Therefore, the large-diameter pressured chamber 70 can be used even in the normal braking region, thereby obtaining a good pedal feel.

(6) The control valve 75 reduces the hydraulic pressure so that the hydraulic pressure drop in the large-diameter pressurized chamber 70 and the hydraulic pressure rise in the small-diameter pressure chamber 61 substantially have a one-to-one relation. Therefore, a good pedal feel can be obtained.

(7) The booster BS includes, in the shells: the constant-pressure chambers B18 and B19 for storing the negative pressure; and the variable-pressure chambers B20 and B21 for storing the negative pressure of the constant-pressure chambers B18 and B19 when the braking is not performed, the atmosphere flowing into the variable-pressure chambers B20 and B21 in response to the input from the brake pedal BP. The full-load point of the booster BS corresponds to a point when there is no longer a difference in pressure between the constant-pressure chambers B18 and B19 and the variable-pressure chambers B20 and B21. Therefore, the switching can be performed so that the hydraulic pressure is generated by the primary hydraulic chamber 61 as the small-diameter pressure chamber alone before the assist force becomes unavailable. As a result, a high braking force can be obtained.

(8) The pressure-intensifying means is the hydraulic pumps for the brake control unit, which is provided between the master cylinder 10 and the wheel cylinders A14 and A15. Therefore, the required performance in case of failure of the booster can be realized by using the existing system. Thus, the master cylinder which can ensure a good pedal feel without increasing cost can be provided. In place of the hydraulic pump, a pressure-accumulating device such as an accumulator may be used as the pressure-intensifying means.

Second Embodiment

In the first embodiment described above, the hydraulic pressure corresponding to 2.5 m/s$^2$ is set to 2.3 MPa, and the hydraulic pressure at which the control valve 75 functioning as the pressure-reducing valve is opened is set as high as about 4 MPa. However, the valve-opening pressure for the control valve 75 is not limited thereto. The hydraulic pressure corresponding to 2.5 m/s$^2$ may be set to a lower value within the aforementioned hydraulic-pressure range of 1.7 MPa to 2.9 MPa, for example, to 1.7 MPa so that the hydraulic pressure at which the control valve 75 is opened may be set to 2 MPa.

Figure 10:
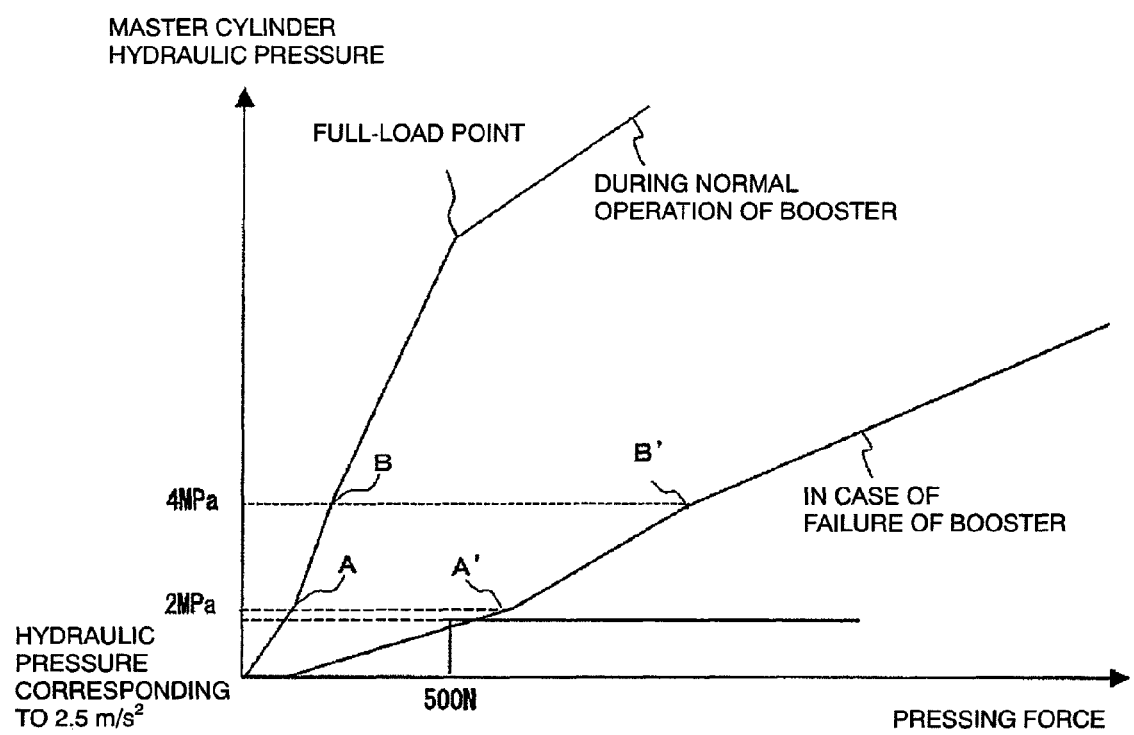
FIG. 10 is a graph showing a relation of a master cylinder hydraulic pressure with respect to the pressing force on a brake pedal according to a second embodiment of the present invention.

In the case of the setting as described above, the relation between the pressing force (muscle force) and the master cylinder hydraulic pressure is as shown in FIG. 10. When the booster BS operates normally, the assist force is generated by the booster BS as a result of the generation of the pressing force on the brake pedal by the driver. Then, the driver can obtain the master cylinder hydraulic pressure of 2 MPa with a relatively short pedal stroke (indicated by a point A in FIG. 10). When the master cylinder hydraulic pressure exceeds 2 MPa, the hydraulic pressure in the large-diameter pressurized chamber 70 is gradually reduced to the atmospheric pressure by the control valve 75, whereas the area of the piston which compresses the primary hydraulic chamber 61 starts changing so as to be equal to the area corresponding to the effective pressure-receiving area of the small-diameter piston portion 65. Therefore, the steep hydraulic pressure rise gradient can be obtained. Specifically, although the pedal stroke is lengthened, the high master cylinder hydraulic pressure can be obtained with a relatively small increase in pressing force. Then, when the hydraulic pressure in the large-diameter pressurized chamber 70 becomes completely equal to the atmospheric pressure, the generation of the master cylinder hydraulic pressure is started by the small-diameter piston portion 65 alone (indicated by a point B shown in FIG. 10).

Thereafter, when the pressing force is further increased, the difference in pressure between the constant-pressure chambers B18 and B19 and the variable-pressure chambers B20 and B21 is gradually reduced. Then, the master cylinder hydraulic pressure reaches the full-load point (for example, 10 MPa) at which the assist force is no longer obtained due to the absence of the difference in pressure between the constant-pressure chambers B18 and B19 and the variable-pressure chambers B20 and B21. From then on, the increase in pressing force directly contributes to the increase in master cylinder hydraulic pressure without the assist force. Specifically, the hydraulic pressure rise gradient becomes smaller than that when the assist force is obtained by the booster BS.

On the other hand, when the booster BS fails, the assist force is not applied to the pressing force. Therefore, during the initial stage during which the pressing of the brake pedal BP is started, the master cylinder hydraulic pressure obtained by dividing the pressing force by the effective pressure-receiving area of the large-diameter piston portion 66 is generated. The hydraulic pressure rise gradient at this time is considerably smaller than that obtained when the assist force is obtained by the booster BS.

When the pressing force reaches 500 N, only the hydraulic pressure lower than 1.7 MPa corresponding to the hydraulic pressure which allows 2.5 m/s$^2$ to be obtained as the deceleration rate of the vehicle is generated. The reason is as follows. Because the valve-opening pressure for the control valve 75 is set to 2 MPa in the second embodiment, the control valve 75 remains closed and the hydraulic pressure is generated by the large-diameter pressurized chamber 70 at this point. However, the insufficient amount of hydraulic pressure can be compensated for by the brake assist control with the pump-up means as in the case of the first embodiment, as described above.

When the pressing force is further increased, the master cylinder hydraulic pressure reaches 2 MPa which is higher than the hydraulic pressure corresponding to 2.5 m/s². At this point, the control valve 75 is opened to reduce the hydraulic pressure in the large-diameter pressurized chamber 70 (indicated by a point A' shown in FIG. 10). Then, when the hydraulic pressure in the large-diameter pressurized chamber 70 becomes completely equal to the atmospheric pressure by opening the control valve 75, the master cylinder hydraulic pressure is generated by the small-diameter piston portion 65 alone (indicated by a point B' shown in FIG. 10).

When the valve-opening hydraulic pressure for the control valve 75 is set to 2 MPa, the degree of shortening of the pedal stroke is reduced as compared with that obtained in the case where the valve-opening hydraulic pressure is set to 4 MPa. However, in the case where the engine negative pressure is disadvantageously lowered during high-altitude driving or the like to reduce the assist force generated by the booster BS when the booster BS operates normally, the range of stroke, in which the hydraulic pressure is generated by the large-diameter pressurized chamber 70 alone, is shorter than that in the case where the valve-opening hydraulic pressure is set to 4 MPa. Therefore, above the aforementioned range of stroke, the hydraulic pressure can be increased with a relatively small pressing force. As a result, a change in operation feel due to the insufficient assist force generated by the booster BS can be compensated for.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2009-086714, filed on Mar. 31, 2009. The entire disclosure of Japanese Patent Application No. 2009-086714, filed on Mar. 31, 2009 including specification, claims, drawings and summary is incorporated herein by reference in its entirety.

The Japanese Patent Application Publication No. 2002-321609 is incorporated herein by reference in its entirety.

What is claimed is:

1. A vehicle braking system, comprising:
a master cylinder comprising:
a small-diameter pressure chamber and a large-diameter pressurized chamber which are formed by a stepped piston inserted into a stepped cylinder, the stepped piston being moved to supply a hydraulic pressure from the large-diameter pressurized chamber to the small-diameter pressure chamber and to generate a hydraulic pressure in the small-diameter pressure chamber, the generated hydraulic pressure being supplied to wheel cylinders; and
a pressure-reducing valve being opened at a predetermined valve-opening pressure by the hydraulic pressure in the small-diameter pressure chamber and a hydraulic pressure in the large-diameter pressurized chamber to bring the large-diameter pressurized chamber into communication with a reservoir so as to reduce the hydraulic pressure in the large-diameter pressurized chamber;
a booster for assisting an input from a brake pedal to move the stepped piston with an assist force, the booster having a full-load point at which the assist force is no longer provided;
detection means for detecting a failure of the booster; and
pressure-intensifying means for generating hydraulic pressure by a hydraulic pressure source different from that of the master cylinder and, in case of the failure of the booster and a pressing force applied to the brake pedal being 500 N, supplying a predetermined hydraulic pressure higher than a hydraulic pressure generated in the small-diameter pressure chamber to the wheel cylinders, in order to compensate an insufficient amount of hydraulic pressure generated by the master cylinder, when the failure of the booster is detected by the detection means,
wherein the valve-opening pressure for the pressure-reducing valve is set so that the pressure-reducing valve is opened when the hydraulic pressure in the small-diameter pressure chamber is higher than the predetermined hydraulic pressure supplied by the pressure-intensifying means in the case of the failure of the booster and the pressing force applied to the brake pedal being 500 N, and is lower than a hydraulic pressure obtained at a time when the booster reaches the full-load point, and
wherein the master cylinder is configured to supply a hydraulic pressure generated in the large-diameter pressurized chamber until the hydraulic pressure in the master cylinder reaches the predetermined hydraulic pressure in case of the failure of the booster.

2. A vehicle braking system according to claim 1, wherein the pressure-reducing valve is set so that the hydraulic pressure in the large-diameter pressurized chamber becomes equal to a hydraulic pressure in the reservoir when the hydraulic pressure in the small-diameter pressure chamber is around the hydraulic pressure obtained at the time when the booster reaches the full-load point.

3. A vehicle braking system according to claim 1, wherein the pressure-reducing valve is set so that the hydraulic pressure in the large-diameter pressurized chamber becomes equal to a hydraulic pressure in the reservoir before the hydraulic pressure in the small-diameter pressure chamber becomes equal to the hydraulic pressure obtained at the time when the booster reaches the full-load point.

4. A vehicle braking system according to claim 1, wherein the pressure-reducing valve is opened when the hydraulic pressure in the small-diameter pressure chamber is a predetermined value that is equal to or higher than a hydraulic pressure which allows a deceleration rate of 3.2 m/s² to be obtained in a case where the booster operates normally.

5. A vehicle braking system according to claim 1, wherein the pressure-reducing valve is opened when the hydraulic pressure in the small-diameter pressure chamber becomes a predetermined value higher than 3 MPa.

6. A vehicle braking system according to claim 1, wherein the pressure-reducing valve gradually reduces the hydraulic pressure in the large-diameter pressurized chamber so that a rate of a hydraulic pressure drop in the large-diameter pressurized chamber with respect to a hydraulic pressure rise in the small-diameter pressure chamber substantially has a one-to-one relation.

7. A vehicle braking system according to claim 1, wherein the pressure-intensifying means is a hydraulic pump for a brake control unit, which is provided between the master cylinder and the wheel cylinders.

8. A vehicle braking system according to claim 1, wherein the pressure-reducing valve is opened when the hydraulic pressure in the small-diameter pressure chamber becomes a predetermined value equal to or higher than 2 MPa.

9. A master cylinder used for a vehicle braking system comprising a booster for assisting an input from a brake pedal and outputting the input with an assist force, the booster having a full-load point at which the assist force is no longer provided, and pressure-intensifying means for generating hydraulic pressure by a hydraulic pressure source different from the master cylinder and, in the case of failure of the booster and a pressing force applied to the brake pedal being 500 N, supplying a predetermined hydraulic pressure higher than a hydraulic pressure generated in the small-diameter pressure chamber to wheel cylinders, in order to compensate an insufficient amount of hydraulic pressure generated by the master cylinder, in the case of failure of the booster, the master cylinder comprising a stepped piston moved by the output of the booster, the master cylinder comprising:

the stepped piston moved by the booster;

a stepped cylinder comprising a small-diameter pressure chamber for supplying a hydraulic pressure to wheel cylinders and a large-diameter pressurized chamber for supplying the hydraulic pressure to the small-diameter pressure chamber, the small-diameter pressure chamber and the large-diameter pressurized chamber being formed by insertion of the stepped piston; and a pressure-reducing valve to be opened at a predetermined valve-opening pressure by the hydraulic pressure in the small-diameter pressure chamber and the hydraulic pressure in the large-diameter pressurized chamber to bring the large-diameter pressurized chamber into communication with a reservoir so as to reduce the hydraulic pressure in the large-diameter pressurized chamber, wherein the valve-opening pressure for the pressure-reducing valve is set so that the pressure-reducing valve is opened when the hydraulic pressure in the small-diameter pressure chamber is higher than the predetermined hydraulic pressure supplied by the pressure-intensifying means in the case of the failure of the booster and the pressing force applied to the brake pedal being 500 N, and is lower than a hydraulic pressure obtained at a time when the booster reaches the full-load point, and wherein the master cylinder is configured to generate a hydraulic pressure in the large-diameter pressurized chamber until the hydraulic pressure in the master cylinder reaches the hydraulic pressure in case of the failure of the booster.

10. A master cylinder according to claim 9, wherein the pressure-reducing valve is set so that the hydraulic pressure in the large-diameter pressurized chamber becomes equal to a hydraulic pressure in the reservoir when the hydraulic pressure in the small-diameter pressure chamber is around the hydraulic pressure obtained at the time when the booster reaches the full-load point.

11. A master cylinder according to claim 9, wherein the pressure-reducing valve is set so that the hydraulic pressure in the large-diameter pressurized chamber becomes equal to a hydraulic pressure in the reservoir before the hydraulic pressure in the small-diameter pressure chamber becomes equal to the hydraulic pressure obtained at the time when the booster reaches the full-load point.

12. A master cylinder according to claim 9, wherein the pressure-reducing valve is opened when the hydraulic pressure in the small-diameter pressure chamber is a predetermined value equal to or higher than a hydraulic pressure which allows a deceleration rate of 3.2 m/s$^2$ to be obtained in a case where the booster operates normally.

13. A master cylinder according to claim 9, wherein the pressure-reducing valve is opened when the hydraulic pressure in the small-diameter pressure chamber becomes a predetermined value higher than 3 MPa.

14. A master cylinder according to claim 9, wherein the pressure-reducing valve gradually reduces the hydraulic pressure in the large-diameter pressurized chamber so that a rate of a hydraulic pressure drop in the large-diameter pressurized chamber with respect to a hydraulic pressure rise in the small-diameter pressure chamber substantially has a one-to-one relation.

15. A master cylinder according to claim 9, wherein the pressure-reducing valve is opened when the hydraulic pressure in the small-diameter pressure chamber becomes a predetermined value equal to or higher than 2 MPa.

* * * * *